US012768796B2

(12) United States Patent
Taguchi et al.

(10) Patent No.: US 12,768,796 B2
(45) Date of Patent: Oct. 20, 2026

(54) CONTAINER INSPECTION DEVICE AND BLISTER PACKAGING MACHINE

(71) Applicant: CKD CORPORATION, Aichi (JP)

(72) Inventors: Yukihiro Taguchi, Aichi (JP); Shiori Imaizumi, Aichi (JP); Shozo Oda, Aichi (JP)

(73) Assignee: CKD Corporation, Aichi (JP)

( * ) Notice: Subject to any disclaimer, the term of this patent is extended or adjusted under 35 U.S.C. 154(b) by 0 days.

(21) Appl. No.: 19/265,532

(22) Filed: Jul. 10, 2025

(65) Prior Publication Data

US 2025/0341477 A1 Nov. 6, 2025

Related U.S. Application Data

(63) Continuation of application No. PCT/JP2023/038507, filed on Oct. 25, 2023.

(30) Foreign Application Priority Data

Feb. 24, 2023 (JP) ................................ 2023-026968

(51) Int. Cl.
*G01N 21/90* (2006.01)
*B65B 9/04* (2006.01)
(Continued)

(52) U.S. Cl.
CPC ......... *G01N 21/9054* (2013.01); *B65B 9/045* (2013.01); *B65B 41/12* (2013.01); *B65B 57/00* (2013.01); *B65D 75/367* (2013.01)

(58) Field of Classification Search
CPC ......... B65B 41/12; B65B 9/045; B65B 57/00; B65D 75/367; G01N 21/9045;
(Continued)

(56) References Cited

U.S. PATENT DOCUMENTS 3,316,411 A * 4/1967 Linderman ........ G01N 21/8916 250/210
4,458,979 A * 7/1984 Ross .................. G01N 21/8901 359/34
(Continued)

FOREIGN PATENT DOCUMENTS

JP H09243574 A 9/1997
JP 2015094694 A 5/2015
JP 2021128033 A 9/2021

OTHER PUBLICATIONS

International Preliminary Report on Patentability issued in corresponding International Application No. PCT/JP2023/038507 mailed Aug. 15, 2025 (6 pages).
(Continued)

*Primary Examiner* — Thomas M Wittenschlaeger
(74) *Attorney, Agent, or Firm* — Osha Bergman Watanabe & Burton LLP

(57) ABSTRACT

A container inspection device includes: an irradiator that irradiates, with light, containers transferred in an arrangement of multiple lines; an imaging sensor that images the radiated light; optical path conversion sheets that convert an optical path of the light; an imaging optical system that forms an image of the light along the converted optical path onto the imaging sensor; and a hardware processor that identifies whether the side walls include a defect based on image data obtained from the light imaged on the imaging sensor. The optical path conversion sheets are laid across the multiple lines. The optical path conversion sheets respectively correspond to the side wall areas, and each of the optical path conversion sheets converts the optical path of the light reflected from or transmitted through a corresponding one of the side wall areas into an optical path along an optical axis of the imaging optical system.

8 Claims, 16 Drawing Sheets

(51) Int. Cl.
*B65B 41/12* (2006.01)
*B65B 57/00* (2006.01)
*B65D 75/36* (2006.01)

(58) Field of Classification Search
CPC ...... G01N 21/85; G01N 21/89; G01N 21/896; G01N 21/9508
See application file for complete search history.

(56) References Cited

U.S. PATENT DOCUMENTS

| | | | | |
|---|---|---|---|---|
| 7,382,457 | B2 * | 6/2008 | Kiraly | G01N 21/896 356/429 |
| 7,894,054 | B2 * | 2/2011 | Backes | G01J 1/4204 356/239.8 |
| 11,414,231 | B2 * | 8/2022 | Taguchi | B65B 61/065 |
| 11,808,714 | B2 * | 11/2023 | Taguchi | B65B 57/12 |
| 11,994,477 | B2 * | 5/2024 | Ohtani | G01N 21/894 |
| 12,007,331 | B2 * | 6/2024 | Taguchi | B29C 51/266 |
| 12,152,996 | B2 * | 11/2024 | Oda | B65B 57/02 |
| 12,279,035 | B2 * | 4/2025 | Taguchi | B65B 11/52 |
| 2001/0053075 | A1 * | 12/2001 | Parker | G02B 6/0021 362/617 |
| 2008/0284850 | A1 * | 11/2008 | Blaesing | B60S 1/0844 348/148 |
| 2009/0261237 | A1 * | 10/2009 | Backes | B60S 1/0837 250/206 |
| 2020/0172279 | A1 * | 6/2020 | Taguchi | B29C 51/10 |
| 2020/0333256 | A1 * | 10/2020 | Taguchi | B29C 51/266 |
| 2020/0369422 | A1 * | 11/2020 | Taguchi | A61J 3/06 |
| 2021/0199594 | A1 * | 7/2021 | Taguchi | B65B 1/02 |

OTHER PUBLICATIONS

International Search Report issued in corresponding International Application No. PCT/JP2023/038507, dated Dec. 5, 2023 (6 pages).

* cited by examiner

CONTAINER INSPECTION DEVICE AND BLISTER PACKAGING MACHINE

BACKGROUND

Technical Field

The present disclosure relates to a container inspection device that inspects a side wall portion of a container and a blister packaging machine provided with the container inspection device.

Description of Related Art

Containers for placing a predetermined content (for example, a medicinal product or a food item) therein have been used generally and widely. The container herein means not only an individual container that is not connected with other containers but a container that is connected with other containers. For example, in a container film provided with a plurality of pocket portions used to place, for example, a tablet therein and with a flange portion provided to connect opening end edges of these pocket portions with one another, the pocket portion corresponds to the container.

The presence of a flaw (for example, a crack or a break) or a hole (for example, a relatively small hole called pinhole or a relatively large hole) is likely to damage the sealing property of the content. Moreover, adhesion of a foreign substance or a dirt on the container is likely to damage the hygiene and the safety of the content. An inspection for the container by using a container inspection device has thus been performed widely.

Some of known container inspection devices allow for an inspection for a side wall portion of a container, which has a difficulty in performing an inspection compared with a bottom wall portion of the container. One proposed configuration of such a container inspection device includes a wide angle lens placed immediately above the opening of a container (paper cup); and an image sensor configured to receive the light that is reflected from a side wall portion of the container through the wide angle lens (as described in, for example, Patent Literature 1).

Another proposed configuration of the container inspection device that allows for an inspection for the side wall portion of the container includes a pair of cameras placed at such positions that a container film is located therebetween in planar view and configured to take an image of a side wall portion of a container (pocket portion) from obliquely above the container; and a determination unit configured to determine the presence or the absence of any hole (pinhole) in the container, based on image data obtained by these cameras (as described in, for example, Patent Literature 2). This container inspection device uses one of the cameras to take an image of a region of the side wall portion that faces the one camera (referred to as "left side wall portion") and uses the other camera to take an image of a region of the side wall portion that faces the other camera (referred to as "right side wall portion").

Furthermore, another proposed configuration of the container inspection device that allows for an inspection for the side wall portion of the container includes a camera configured to take an image of a container (pocket portion) via a prism sheet (light collecting sheet) and determines the presence or the absence of a hole in a side wall portion of the container, based on image data obtained by the camera (as described in, for example, Patent Literature 3).

Patent Literature

Patent Literature 1: Japanese Patent No. H09-243574A
Patent Literature 2: Japanese Patent No. 2021-128033A
Patent Literature 3: Japanese Patent No. 2015-94694A The container inspection device disclosed in the above Patent Literature 1, however, limits the number of the container that can be imaged by a device provided with one wide angle lens and one image sensor (i.e., by one camera) to only one. This container inspection device is not capable of performing a simultaneous inspection for a plurality of containers and accordingly has a low inspection efficiency.

The container inspection device disclosed in the above Patent literature 2, on the other hand, allows for simultaneous imaging of a plurality of containers by one pair of cameras and thereby allows for a simultaneous inspection for these containers. In this container inspection device, however, the size of each of the left side wall portion and the right side wall portion in the image data is varied by the location of the container along a width direction of the container film. For example, the left side wall portion or the right side wall portion of the container located on an edge side in the width direction of the container film, which is also a side distant from the camera, has a relatively small area in the image data. This is likely to cause a variation in inspection accuracy by the location of the container.

Additionally, in the container inspection device disclosed in the above Patent Literature 3, the image data obtained via the prism sheet is likely to be blurred. Even in the case where there is any foreign substance, any flaw or any dirt on the side wall portion, it is accordingly difficult to determine the presence or the absence of a foreign substance, a flaw or a dirt with the high accuracy, based on the blurred image data. Furthermore, this container inspection device is capable of determining the presence or the absence of any hole (any high luminance portion) based on the image data but has a difficulty in specifying the position of the hole based on the image data. The container inspection device disclosed in the above Patent Literature 3 is thus likely to have the low accuracy in determination of the presence or the absence of any defective part (any foreign substance, any flaw or any dirt) and, even if the presence or the absence of any defective part (any hole) is successfully determined, is also likely to fail in accurately specifying the position of the defective part.

SUMMARY

By taking into account the circumstances described above, one or more embodiments of the present disclosure provide a container inspection device or the like that determine the presence or the absence of any defective part in a side wall with the high accuracy and to specify the position of the defective part with the higher precision, while improving the inspection efficiency and suppressing a variation in inspection accuracy.

The following describes each of various aspects of the present disclosure. Functions and advantageous effects that are characteristic of each of the aspects are also described as appropriate.

Aspect 1. There is provided a container inspection device comprising: an irradiator that irradiates, with predetermined light, a plurality of containers transferred in an arrangement of multiple lines; an imaging sensor that images the light radiated from the irradiator; optical path conversion sheets that convert an optical path of the light radiated from the irradiator and reflected from or transmitted through side wall areas that extend in a circumferential direction of side walls of each of the containers; an imaging optical system that forms an image of the light along the optical path converted by the optical path conversion sheets, onto the imaging sensor; and a hardware processor that identifies whether the side walls include a defect, based on image data obtained from the light imaged on the imaging sensor. The optical path conversion sheets are laid across the multiple lines of the containers when viewed from an imaging sensor side, and disposed along a transfer direction of the containers. The optical path conversion sheets respectively correspond to the side wall areas, and each of the optical path conversion sheets converts the optical path of the light reflected from or transmitted through a corresponding one of the side wall areas into an optical path along an optical axis of the imaging optical system. The side wall areas respectively corresponding to the optical path conversion sheets cover an entire circumference of the side walls.

In the container inspection device of above Aspect 1, the optical path conversion sheet is laid across multiple lines of the containers, when being viewed from the imaging sensor side. The configuration of Aspect 1 causes the optical path of the light reflected from or transmitted through the plurality of containers to be converted by the optical path conversion sheet and forms an image of the light having the converted optical path, onto the imaging sensor via the imaging optical system. This configuration allows for a simultaneous inspection for the plurality of containers and thereby improves the inspection efficiency.

Moreover, in the container inspection device of above Aspect 1, the plurality of side wall areas corresponding to the respective optical path conversion sheets cover the entire circumference of the side wall of the container. This configuration thus allows for an inspection for the entire circumference of the side wall.

Furthermore, in the container inspection device of above Aspect 1, the plurality of optical path conversion sheets respectively correspond to different side wall areas. Each of the optical path conversion sheets converts the optical path of the light reflected from or transmitted through the corresponding side wall area into an optical path along the direction of the optical axis of the imaging optical system. The imaging optical system then forms an image of the light along the optical path converted by the optical path conversion sheet, onto the imaging sensor. Compared with a prior art configuration of obliquely imaging the container, the configuration of this aspect more reliably prevents a variation in the size (the area) of each of the side wall areas in the image data by the location of the container. This configuration accordingly suppresses a variation in inspection accuracy by the location of the container. The configuration of this aspect also suppresses a part relating to the side wall area in the image data from being affected by the light reflected from the other part of the container and provides the clearer contour and the clearer shape of the part relating to the side wall area and the clearer contour and the clearer shape of any defective part (for example, a dirt, a foreign substance or a hole) located in the side wall area in the image data. As a result, this configuration can determine the presence or the absence of any defective part in the side wall with the high accuracy and can specify the location of the defective part with the higher precision.

Aspect 2. In the container inspection device described in above Aspect 1, the imaging optical system may serve as an object-side telecentric optical system and comprise a diaphragm that regulates the light imaged on the imaging sensor.

In the container inspection device of above Aspect 2, the diaphragm serves to regulate the light imaged on the imaging sensor, out of the lights having the optical paths converted by the optical path conversion sheets. This configuration accordingly enables appropriate image data for an inspection to be obtained more certainly and more readily.

Aspect 3. In the container inspection device described in above Aspect 1, the imaging optical system may comprise an object-side lens that focuses the lights along the optical path converted by the optical path conversion sheets, and the object-side lens may be a Fresnel lens.

In the container inspection device of above Aspect 3, the object-side lens is a Fresnel lens. This provides the object-side lens having a relatively small thickness. This configuration suppresses size expansion of the device and enhances the flexibility in installation of the device.

Aspect 4. In the container inspection device described in above Aspect 1, each of the optical path conversion sheets may have a surface with protrusions arranged in parallel to one another. Each of the protrusions may comprise a vertical face having an angle of not less than 80 degrees and not greater than 95 degrees with respect to a flat rear face of each of the optical path conversion sheets in a cross section perpendicular to an extending direction of the protrusions; and an inclined face having an angle of not less than 10 degrees and not greater than 55 degrees with respect to the rear face in the cross section.

The configuration of above Aspect 4 enables each of the optical path conversion sheets to more reliably convert the optical path of the light reflected from or transmitted through the corresponding one of the side wall areas into an optical path along the direction of the optical axis of the imaging optical system, while more effectively preventing the optical path conversion sheet from converting the optical path of the light reflected from or transmitted through the other part of the container into an optical path along the direction of the optical axis. This configuration more reliably provides the clearer contour and the clearer shape of the part relating to each of the side wall areas and the clearer contour and the clearer shape of any defective part. As a result, this configuration can determine the presence or the absence of any defective part in the side wall with the higher accuracy and can specify the location of the defective part with the higher precision.

Aspect 5. In the container inspection device described in above Aspect 1, the irradiator may be disposed between the optical path conversion sheets.

The configuration of above Aspect 5 enables the irradiator to be placed within the space between the optical path conversion sheets and thereby achieves size reduction of the device.

Aspect 6. In the container inspection device described in above Aspect 1, the containers may be connected with one another by a flange portion extending outward from respective edges of the side walls. The imaging optical system may form an image of light reflected from or transmitted through the flange portion, from between the optical path conversion sheets, onto the imaging sensor. The hardware processor may identify whether the flange portion includes a defect, based on the image data.

The configuration of above Aspect 6 allows for an inspection for not only the side wall of each container but the flange portion that connects the containers with each other. This configuration thus further improves the inspection efficiency, compared with a configuration of separately inspecting the containers and the flange portion.

Aspect 7. In the container inspection device described in above Aspect 1, the imaging optical system may form an image of light reflected from or transmitted through a bottom wall of each of the containers, from between the optical path conversion sheets, onto the imaging sensor, and the hardware processor may identify whether the bottom wall includes a defect, based on the image data.

The configuration of above Aspect 7 allows for an inspection for not only the side wall of each container but the bottom wall of the container. This accordingly further improves the efficiency in relation to the inspection of the container.

Aspect 8. There is provided a blister packaging machine that manufactures a blister sheet in which a content is placed in a pocket portion formed in a container film and a cover film is mounted to the container film such as to close the pocket portion. The blister packaging machine comprises a pocket portion forming device that forms the pocket portions to be arranged in multiple lines in a belt-shaped container film; a roll that transfers the container film; a filling device that fills each of the pocket portions with the content; and the container inspection device described in above Aspect 1. The container inspection device is disposed between the pocket portion forming device and the filling device along a transfer path of the container film, and identifies whether the side wall of each of the pocket portions include a defect.

The configuration of above Aspect 8 has similar functions and advantageous effects to those of Aspect 1 described above.

The technical features of the respective aspects described above may be combined appropriately. For example, the technical features with regard to above Aspect 3 may be combined with the technical features with regard to above Aspect 2. In another example, the technical features with regard to at least one of the above aspects 2 to 7 may be combined with the technical features with regard to above Aspect 8.

DETAILED DESCRIPTION OF EMBODIMENTS

The following describes embodiments with reference to drawings. The configuration of a PTP sheet as a "blister sheet" is described first.

Figure 1:
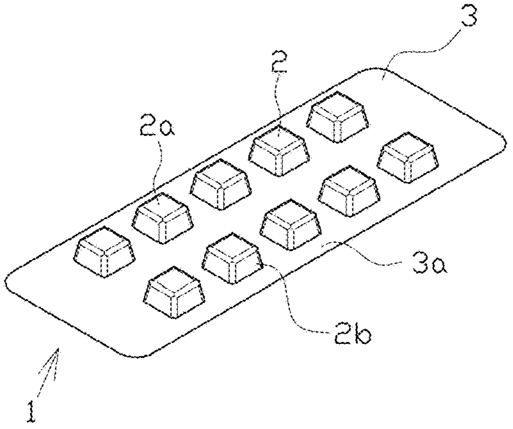
FIG. 1 is a perspective view illustrating a PTP sheet.
Figure 2:
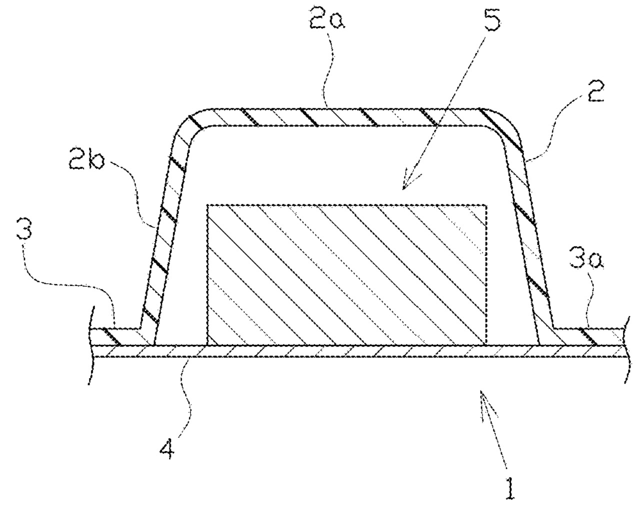
FIG. 2 is a partly enlarged sectional view illustrating the PTP sheet.

As shown in FIG. 1 and FIG. 2, a PTP sheet 1 includes a container film 3 provided with a plurality of pocket portions 2, and a cover film 4 mounted to the container film 3 such as to close the respective pocket portions 2. According to one or more embodiments, the pocket portion 2 corresponds to the "container".

The pocket portion 2 has a rectangular shape in planar view and includes a flat bottom wall portion (or flat bottom wall) 2*a* and a side wall portion (or side wall) 2*b* in a rectangular tubular shape that is continuous with an outermost circumferential part of the bottom wall portion 2*a*. The side wall portion 2*b* is in such a shape that gradually expands toward an opening side of the pocket portion 2.

The container film 3 is made of a transparent thermoplastic resin material, such as PP (polypropylene) or PVC (polyvinyl chloride) and has translucency. The container film 3 has a predetermined thickness (for example, not less than 120 μm and not greater than 300 μm).

The container film 3 also has a flat flange portion 3*a* that is extended outward from an edge end of the side wall portion 2*b* to join a plurality of pocket portions 2 with one another. The flange portion 3*a* is a region as an object which the cover film 4 is mounted to.

The cover film 4 is, on the other hand, made of an opaque material (for example, aluminum foil) with a sealant made of, for example, a polypropylene resin, provided on a surface thereof.

Figure 3:
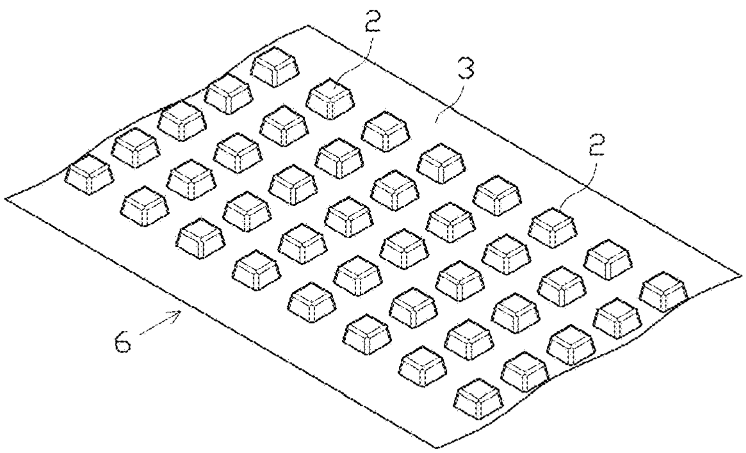
FIG. 3 is a perspective view illustrating a PTP film.

The PTP sheet 1 is manufactured by punching out in a sheet-like form from a belt-shaped PTP film 6 (as shown in FIG. 3) as a blister film comprised of a belt-shaped container film 3 and a belt-shaped cover film 4 and is formed in an approximately rectangular shape in planar view.

The PTP sheet 1 has two pocket portion arrays formed in a sheet short side direction, and each pocket portion array includes five pocket portions 2 arranged along a sheet longitudinal direction. In other words, a total of ten pocket portions 2 are formed. One tablet 5 as a "content" is placed in each of the pocket portions 2.

The following describes the schematic configuration of a PTP packaging machine 10 that manufactures the PTP sheet 1 described above. According to one or more embodiments, the PTP packaging machine 10 corresponds to the "blister packaging machine".

Figure 4:
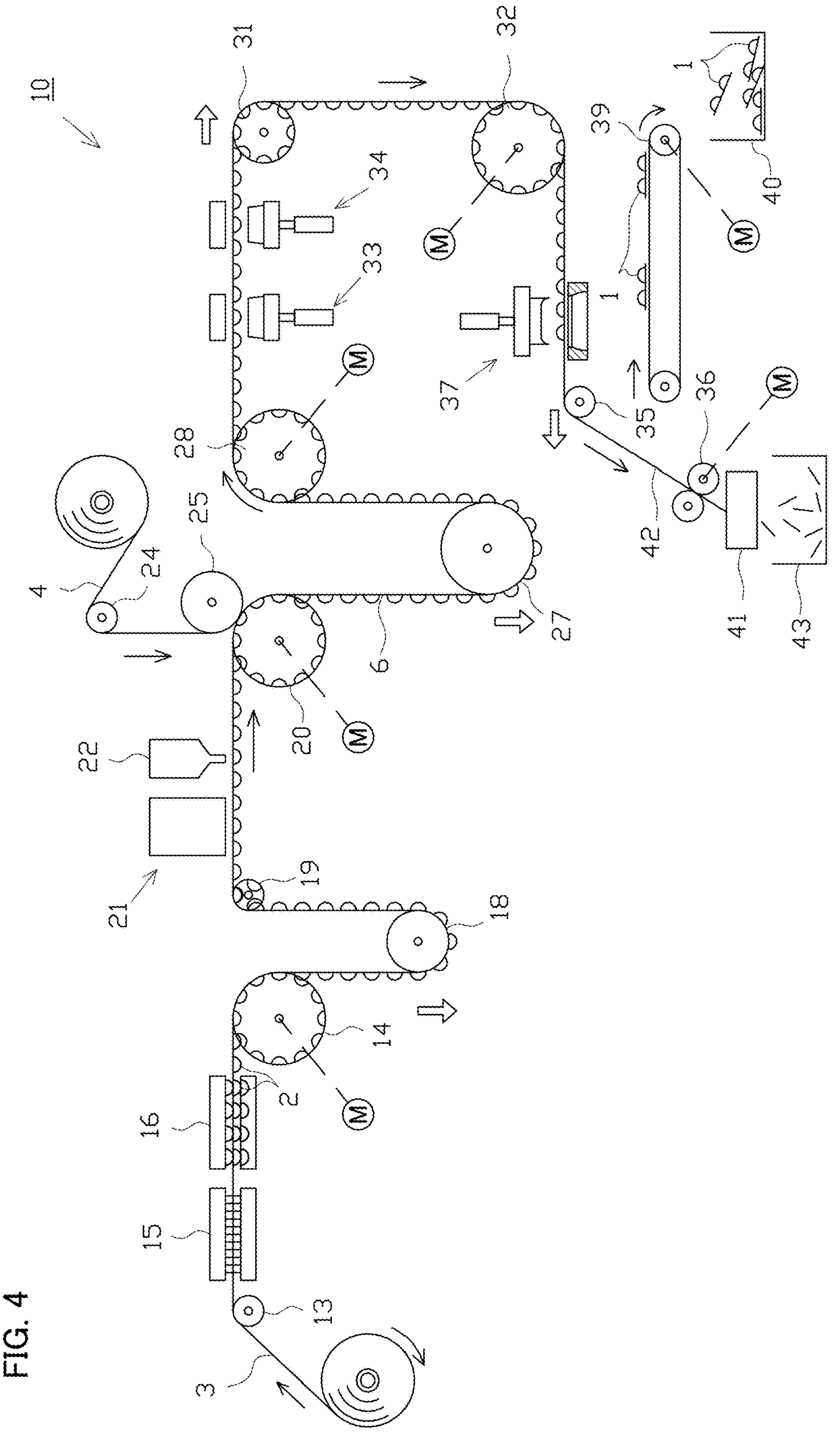
FIG. 4 is a schematic diagram illustrating the schematic configuration of a PTP packaging machine.

As shown in FIG. 4, a film roll of the belt-shaped container film 3 is wound in a roll form on a most upstream side of the PTP packaging machine 10. A pullout end of the container film 3 wound in the roll form is guided by a guide roll 13. The container film 3 is then laid on an intermittent feed roll 14 provided on a downstream side of the guide roll 13. The intermittent feed roll 14 is connected with a motor rotating in an intermittent manner, so as to transfer the container film 3 in an intermittent manner.

A heating device 15 and a pocket portion forming device 16 are sequentially placed along a transfer path of the container film 3 between the guide roll 13 and the intermittent feed roll 14. In the state that the container film 3 is heated to be relatively soft by the heating device 15, a plurality of pocket portions 2 are formed at predetermined positions of the container film 3 by the pocket portion forming device 16. In FIG. 4, as a matter of convenience, the pocket portions 2 are expressed in a rounded shape. Formation of the pocket portions 2 is performed during an interval between transfer operations of the container film 3 by the intermittent feed roll 14. According to one or more embodiments, the pocket portion forming device 16 configures the "pocket portion forming unit".

The container film 3 fed from the intermittent feed roll 14 is sequentially laid on a tension roll 18, a guide roll 19 and a film receiving roll 20 in this order. The film receiving roll 20 is connected with a motor rotating at a constant rate, so as to transfer the container film 3 continuously at a constant rate. As the container film 3 is transferred by the film receiving roll 20, the pocket portions 2 are transferred in an arrangement of multiple lines. According to one or more embodiments, the film receiving roll 20 configures the "transfer unit".

The tension roll 18 is configured to pull the container film 3 in a direction of applying tension by an elastic force. This configuration prevents a slack of the container film 3 due to a difference between the transfer operation by the intermittent feed roll 14 and the transfer operation by the film receiving roll 20 and to constantly keep the container film 3 in the state of tension.

A container inspection device 21 and a filling device 22 are sequentially placed along the transfer path of the container film 3 between the guide roll 19 and the film receiving roll 20. According to one or more embodiments, the filling device 22 configures the "filling unit".

The container inspection device 21 is provided along the transfer path of the container film 3 between the pocket portion forming device 16 and the filling device 22 and is configured to perform an inspection for at least the side wall portion 2*b* of the pocket portion 2. The details of the container inspection device 21 will be described later.

The filling device 22 is configured to fill each of the pocket portions 2 with the tablet 5 by, for example, opening a shutter at every predetermined interval and freely dropping the tablet 5.

A film roll of the cover film 4 formed in the belt shape is, on the other hand, wound in a roll form on a most upstream side. A pullout end of the cover film 4 wound in the roll form is guided by a guide roll 24 to a heating roll 25.

The heating roll 25 is configured to be pressed against and brought into contact with the film receiving roll 20. The container film 3 and the cover film 4 are fed into between these two rolls 20 and 25. The container film 3 and the cover film 4 pass through between the two rolls 20 and 25 in the heated and pressed contact state, so that the cover film 4 is mounted to the container film 3 such as to close the respective pocket portions 2. This series of operations manufactures the belt-shaped PTP film 6 with the tablets 5 placed in the respective pocket portions 2.

The PTP film 6 fed from the film receiving roll 20 is sequentially laid on a tension roll 27 and an intermittent feed roll 28 in this order. The intermittent feed roll 28 is connected with a motor rotating in an intermittent manner, so as to transfer the PTP film 6 in an intermittent manner. The tension roll 27 is configured to pull the PTP film 6 in a direction of applying tension by an elastic force. This configuration prevents a slack of the PTP film 6 due to a difference between the transfer operation by the film receiving roll 20 and the transfer operation by the intermittent feed roll 28 and to constantly keep the PTP film 6 in the state of tension.

The PTP film 6 fed from the intermittent feed roll 28 is sequentially laid on a tension roll 31 and an intermittent feed roll 32 in this order. The intermittent feed roll 32 is connected with a motor rotating in an intermittent manner, so as to transfer the PTP film 6 in an intermittent manner. The tension roll 31 is configured to pull the PTP film 6 in a direction of applying tension by an elastic force. This configuration prevents a slack of the PTP film 6 between these intermittent feed rolls 28 and 32.

A slit formation device 33 and a stamping device 34 are placed along the transfer path of the PTP film 6 between the intermittent feed roll 28 and the tension roll 31. The slit formation device 33 has a function of forming cutting slits at predetermined positions of the PTP film 6. The stamping device 34 has a function of stamping marks at predetermined positions of the PTP film 6. The cutting slits and the marks are omitted from the illustration of FIG. 1 and other relevant drawings.

The PTP film 6 fed from the intermittent feed roll 32 is sequentially laid on a tension roll 35 and a continuous feed roll 36 in this order, downstream of the intermittent feed roll 32. A sheet punching device 37 is placed along the transfer path of the PTP film 6 between the intermittent feed roll 32 and the tension roll 35. The sheet punching device 37 has a function of punching out the outer periphery of each unit of PTP sheet 1 from the PTP film 6, i.e., a function of separating respective PTP sheets 1 from the PTP film 6.

The respective PTP sheets 1 obtained by the sheet punching device 37 are transferred by a conveyor 39 and are temporarily accumulated in a finished product hopper 40. In the case where a PTP sheet 1 is determined as defective by the container inspection device 21, however, the PTP sheet 1 determined as defective is not delivered to the finished product hopper 40 but is separately discharged by a non-illustrated defective sheet discharge mechanism.

A cutting device 41 is placed downstream of the continuous feed roll 36. An unnecessary film portion 42 that is a residual material portion (scrap portion) remaining in a belt shape after punch-out by the sheet punching device 37 is guided by the tension roll 35 and the continuous feed roll 36 and is then led to the cutting device 41. The cutting device 41 is configured to cut the unnecessary film portion 42 into predetermined dimensions. The cut pieces of the unnecessary film portion 42 (scraps) are accumulated in a scrap hopper 43 and are then disposed of.

The following describes the container inspection device 21. The container inspection device 21 is configured to perform an inspection for the side wall portions 2*b* of the pocket portions 2 that are transferred in an arrangement of multiple lines. As shown in FIGS. 5 to 8, the container inspection device 21 includes an illumination device 51, optical path conversion sheets 52*a*, 52*b*, 52*c* and 52*d*, an object-side lens (objective lens) 53, a camera 54, and an image processing device (processor or hardware processor) 55. The container inspection device 21 may include a display unit configured to display information stored in the image processing device 55 and an input unit (for example, a keyboard) configured to input information into the image processing device 55. According to one or more embodiments, the illumination device 51 configures the "irradiation unit (or irradiator)", and the image processing device 55 configures the "determination unit". In the description below, the optical path conversion sheets 52*a*, 52*b*, 52*c* and 52*d* may be expressed in a simplified manner as "optical path conversion sheets 52*a* to 52*d*".

The illumination device 51 is configured to irradiate the plurality of pocket portions 2 with predetermined light (for example, ultraviolet light). The illumination device 51 includes a light source 51*a* configured by, for example, an LED, and a light guide plate 51*b*. The light guide plate 51*b* is configured to guide the light emitted from the light source 51*a* to the container film 3 (the pocket portions 2). According to one or more embodiments, the light emitted from the illumination device 51 to the container film 3 (the pocket portions 2) has such a wavelength that is not allowed to pass through the container film 3 (the pocket portions 2) having a normal thickness. The light guide plate 51*b* may be, for example, a thin plate made of, for example, an acrylic material with dots formed on a surface thereby by printing or ultrasonic machining and may have a surface-emitting capability.

Additionally, the light guide plate 51*b* is configured to receive the light from the light source 51*a* and emit light toward the container film 3 (toward the pocket portions 2), while not emitting light toward an opposite side (toward a camera 54-side) that is opposite to the container film 3 (the pocket portions 2). The light guide plate 51*b* is configured to allow the light reflected from the container film 3 (the pocket portions 2) to pass therethrough.

Figure 11:
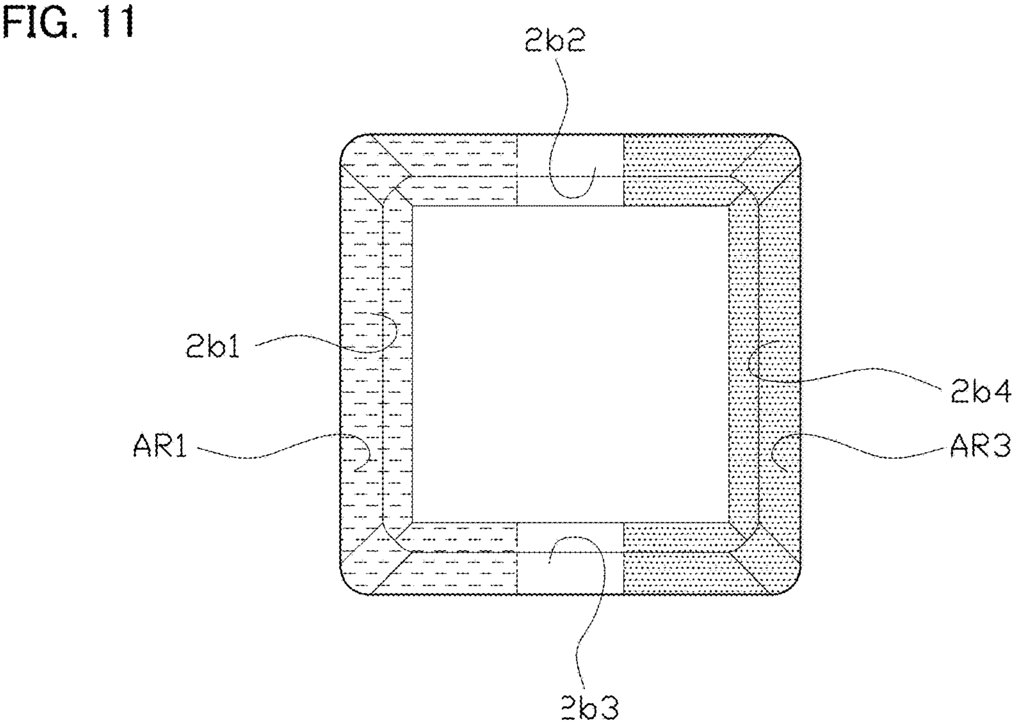
FIG. 11 is a schematic enlarged plan view illustrating one side wall areas.
Figure 12:
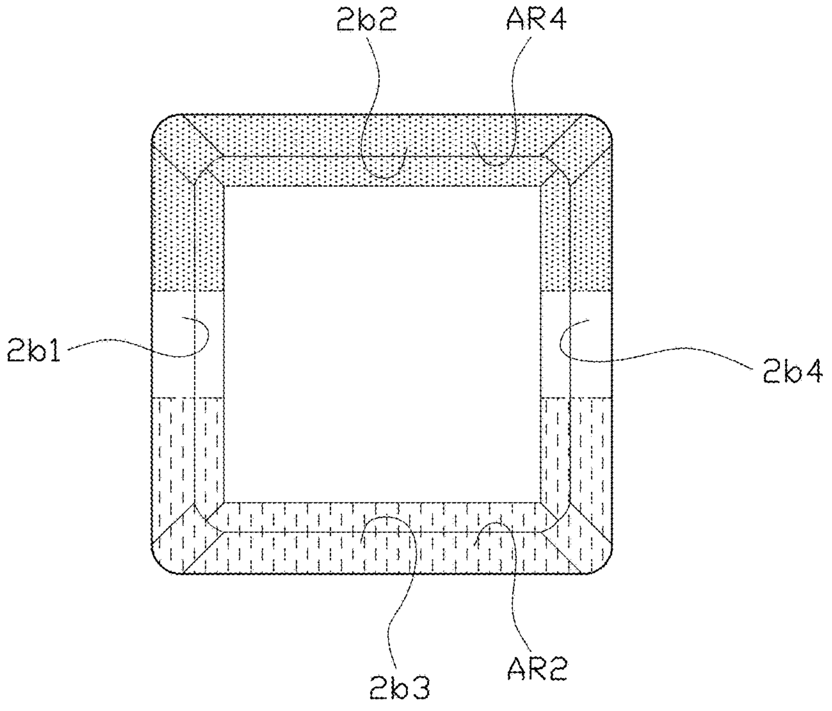
FIG. 12 is a sectional enlarged plan view illustrating the one side wall areas.

The optical path conversion sheets 52*a* to 52*d* are configured to convert the optical paths of lights reflected from one side wall areas (or side wall areas) AR1, AR2, AR3 and AR4 (shown in FIG. 11 and FIG. 12), which are continuous in a circumferential direction of the side wall portion 2*b*, into optical paths along a direction of an optical axis OA of an imaging optical system 56 described later (i.e., optical paths parallel to the optical axis OA). In the description below, the one side wall areas AR1, AR2, AR3 and AR4 may be expressed in a simplified manner as "one side wall areas AR1 to AR4".

Figure 9:
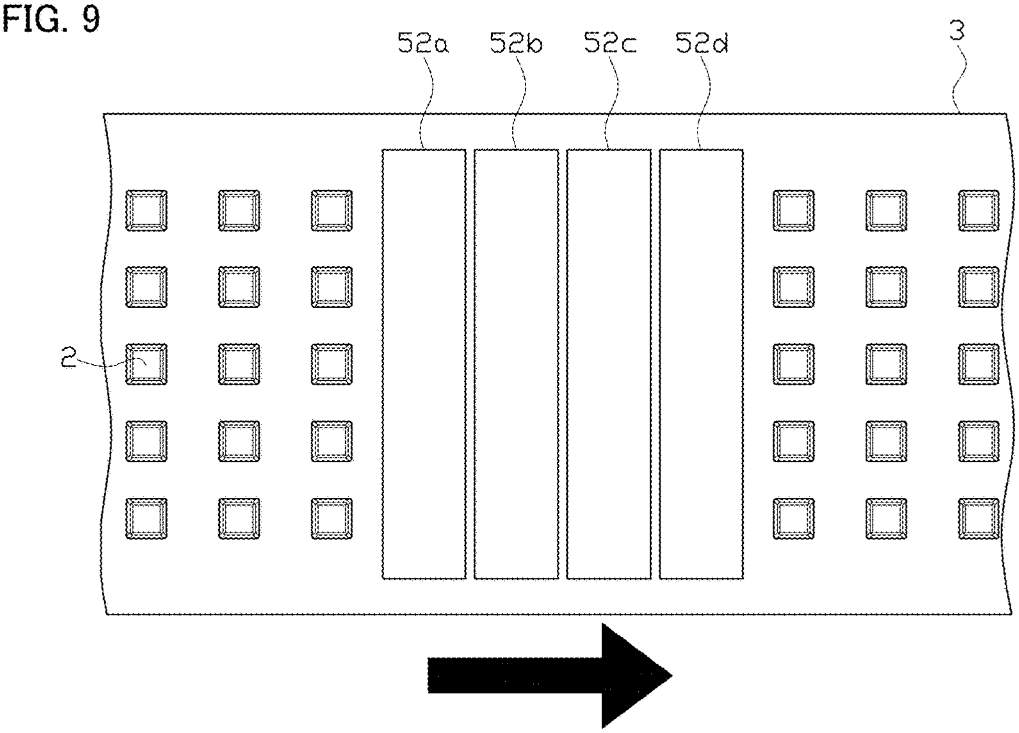
FIG. 9 is a schematic plan view illustrating a container film and optical path conversion sheets.

The optical path conversion sheets 52*a* to 52*d* are placed between the illumination device 51 and the container film 3 (the pocket portions 2) and are provided at fixed intervals along a transfer direction of the container film 3 (the pocket portions 2). Furthermore, the optical path conversion sheets 52*a* to 52*d* (more specifically, flat rear faces 52*r* thereof (shown in FIG. 13)) are set perpendicular to the optical axis OA and parallel to the transfer direction of the pocket portions 2. Moreover, each of the optical path conversion sheets 52*a* to 52*d* is provided to be laid across a plurality of lines of the pocket portions 2 (five lines according to one or more embodiments) when being viewed from the camera 54-side (more specifically, from an imaging element 54*c*-side (or imaging sensor side) described later) (as shown in FIG. 9).

Additionally, each of the optical path conversion sheets 52*a* to 52*d* corresponds to different one of the one side wall areas AR1 to AR4 and is configured to convert the optical path of the light reflected from the corresponding one of the one side wall areas AR1 to AR4 into a direction along the direction of the optical axis OA. The entire circumference of the side wall portion 2*b* is covered by the one side wall areas AR1 to AR4 corresponding to the optical path conversion sheets 52*a* to 52*d*.

According to one or more embodiments, the one side wall area AR1 corresponding to the optical path conversion sheet 52*a* is an area (i.e., an area filled with broken lines in FIG. 11) including the entirety of a downstream-side side wall portion 2*b*1, part of a left-side side wall portion 2*b*2, and part of a right-side side wall portion 2*b*3. The downstream-side side wall portion 2*b*1 is a region on a downstream side in the transfer direction of the container film 3 (the pocket portions 2) in the side wall portion 2*b*. The left-side side wall portion 2*b*2 is a region on one end side in a width direction of the container film 3 in the side wall portion 2*b*. The right-side side wall portion 2*b*3 is a region on the other end side in the width direction of the container film 3 in the side wall portion 2*b*.

The one side wall area AR2 corresponding to the optical path conversion sheet 52*b* is, on the other hand, an area (i.e., an area filled with broken lines in FIG. 12) including the entirety of the right side side wall portion 2*b*3, part of the downstream-side side wall portion 2*b*1, and part of an upstream-side side wall portion 2*b*4. The upstream-side side wall portion 2*b*4 is a region on an upstream side in the transfer direction of the container film 3 (the pocket portions 2) in the side wall portion 2*b*.

Furthermore, the one side wall area AR3 corresponding to the optical path conversion sheet 52*c* is an area (i.e., an area filled with dots in FIG. 11) including the entirety of the upstream-side side wall portion 2*b*4, part of the left-side side wall portion 2*b*2, and part of the right-side side wall portion 2*b*3 in the side wall portion 2*b*.

Additionally, the one side wall area AR4 corresponding to the optical path conversion sheet 52*d* is an area (i.e., an area filled with dots in FIG. 12) including the entirety of the left-side side wall portion 2*b*2, part of the downstream-side side wall portion 2*b*1, and part of the upstream-side side wall portion 2*b*4 in the side wall portion 2*b*.

Furthermore, a plurality of protrusions 52*t* arranged in parallel to one another are formed on a face on the container film 3-side (the pocket portions 2-side) of each of the optical path conversion sheets 52*a* to 52*d*. The face with the protrusions 52*t* formed thereon is referred to as the surface of each of the optical path conversion sheets 52*a* to 52*d*.

Figure 13:
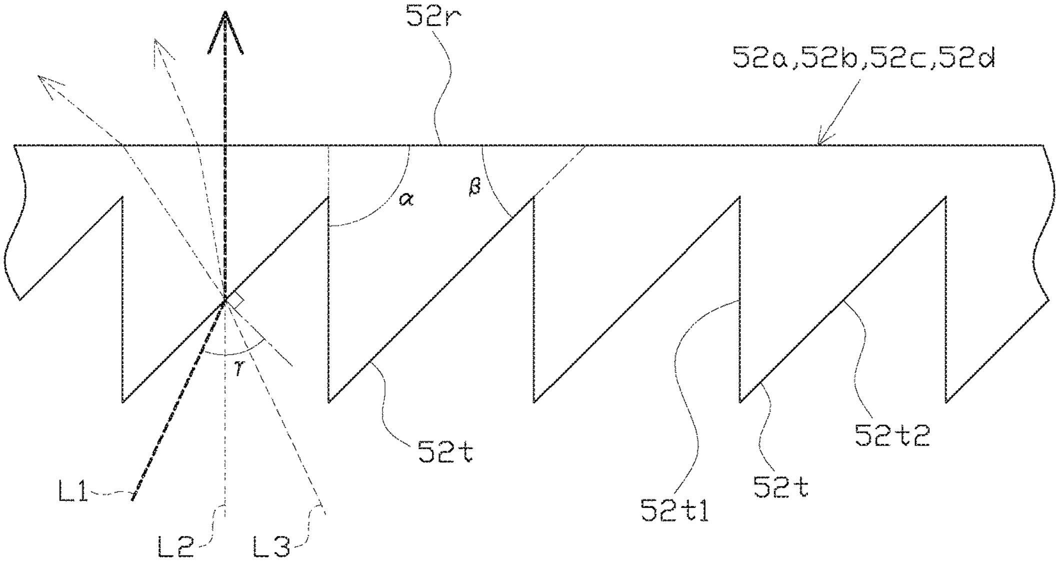
FIG. 13 is a schematic enlarged sectional view illustrating the optical path conversion sheet.

As shown in FIG. 13, each of the protrusions 52*t* is in an approximately right triangle shape in a cross section perpendicular to an extending direction of the protrusions 52*t* and includes an approximately vertical face 52*t*1 and an inclined face 52*t*2. Hatching is omitted from FIG. 13 for the convenience of illustration.

The approximately vertical face 52*t*1 is a face that is extended in a direction approximately perpendicular to a flat rear face 52*r* of each of the optical path conversion sheets 52*a* to 52*d* in the above cross section and that has an angle α of not less than 80 degrees and not greater than 95 degrees relative to the rear face 52*r*.

Figure 10:
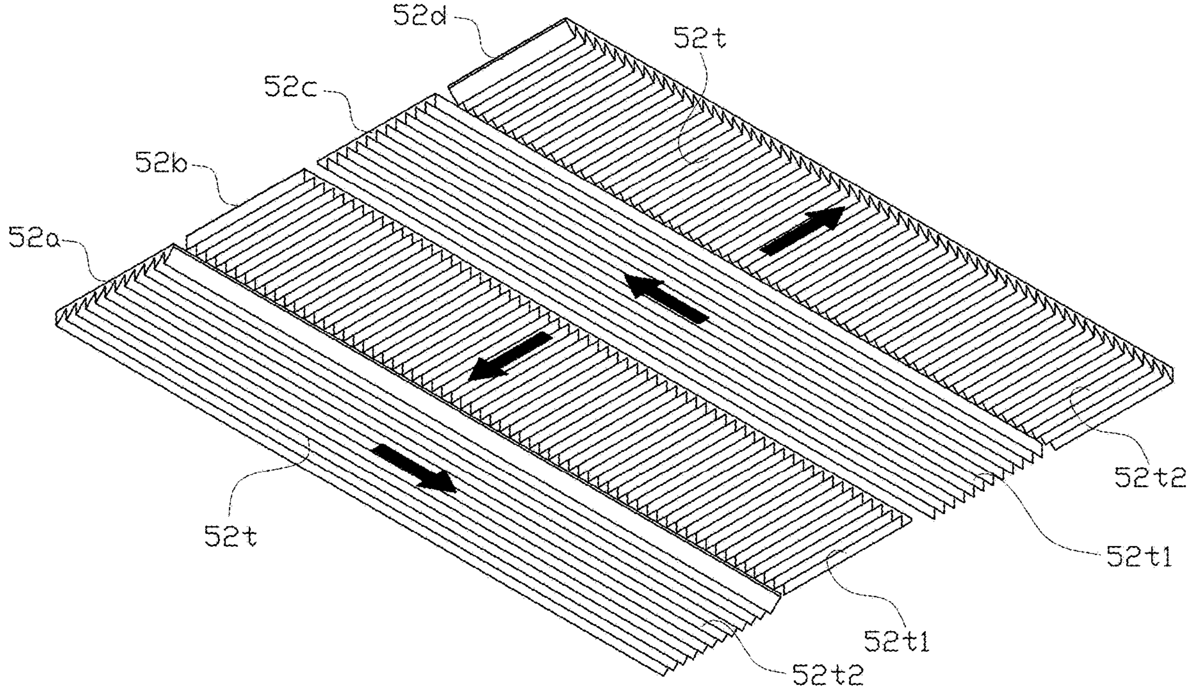
FIG. 10 is a schematic perspective view illustrating optical path conversion sheets to indicate extending directions of protrusions thereof.

The inclined face 52*t*2 is a face that is extended in an oblique direction relative to the rear face 52*r* in the above cross section and that has an angle β of not less than 10 degrees and not greater than 55 degrees. Refraction of light by the inclined face 52*t*2 causes the optical path of light reflected from the side wall portion 2*b* and the like to be converted into an optical path along the optical axis OA. More specifically, an optical path of light L1 (shown by a thick broken line in FIG. 13) having an incidence angle γ to the inclined face 52*t*2 that is a predetermined angle greater than the angle β, is converted into an optical path along the optical axis OA. Optical paths of lights L2 and L3 having incidence angles to the inclined face 52*t*2 that are not greater than the angle β are, on the other hand, not converted into optical paths along the optical axis OA but are converted into optical paths oblique to the optical axis OA, The extending directions of the protrusions 52*t* in the respective optical path conversion sheets 52*a* to 52*d* differ by 90 degrees (as shown in FIG. 10: the extending directions of the protrusions 52*t* are shown by arrows in FIG. 10). The extending direction of the protrusions 52*t* herein denotes a direction going along the protrusions 52*t* in such a manner that the approximately vertical faces 52*t*1 of the protrusions 52*t* are located on a right side and the inclined faces 52*t*2 of the protrusions 52*t* are located on a left side, when the surface (the face with the protrusions 52*t* formed thereon) of each of the optical path conversion sheets 52*a* to 52*d* is viewed from a front side (in bottom view according to one or more embodiments).

According to one or more embodiments, the extending direction of the protrusions 52*t* in the optical path conversion sheet 52*a* is a direction perpendicular to the transfer direction of the container film 3 (the pocket portions 2) and is a direction from one end side in the width direction of the container film toward the other end side in the width direction (i.e., a direction from a line of the pocket portions 2 on the one end side toward a line of the pocket portions 2 on the other end side).

Furthermore, the extending direction of the protrusions 52*t* in the optical path conversion sheet 52*b* is a direction parallel to the transfer direction of the container film 3 (the pocket portions 2) and is a direction identical with the transfer direction.

Moreover, the extending direction of the protrusions 52*t* in the optical path conversion sheet 52*c* is a direction perpendicular to the transfer direction of the container film 3 (the pocket portions 2) and is a direction from the other end side in the width direction of the container film 3 toward the one end side in the width direction (i.e., a direction from a line of the pocket portions on the other end side toward a line of the pocket portions 2 on the one end side).

Additionally, the extending direction of the protrusions 52*t* in the optical path conversion sheet 52*d* is a direction parallel to the transfer direction of the container film 3 (the pocket portions 2) and is a direction opposite to the transfer direction.

Figure 14:
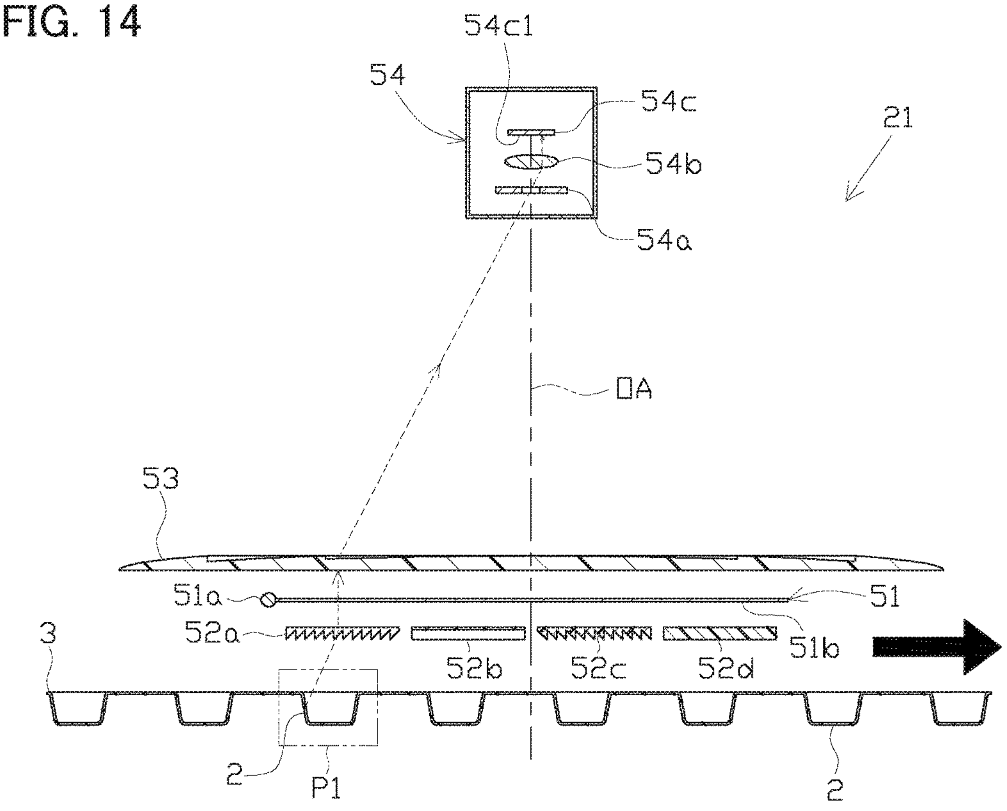
FIG. 14 is a schematic sectional view illustrating the container inspection device at the time of imaging pocket portions located in a first position.

According to one or more embodiments, lights reflected from the one side wall areas AR1 of pocket portions 2 located in a predetermined first position P1 (shown in FIG. 14) enter the inclined faces 52*t*2 of the optical path conversion sheet 52*a*, while the optical paths of the lights reflected from the one side wall areas AR1 are converted into optical paths along the optical axis OA by the optical path conversion sheet 52*a*.

Figure 16:
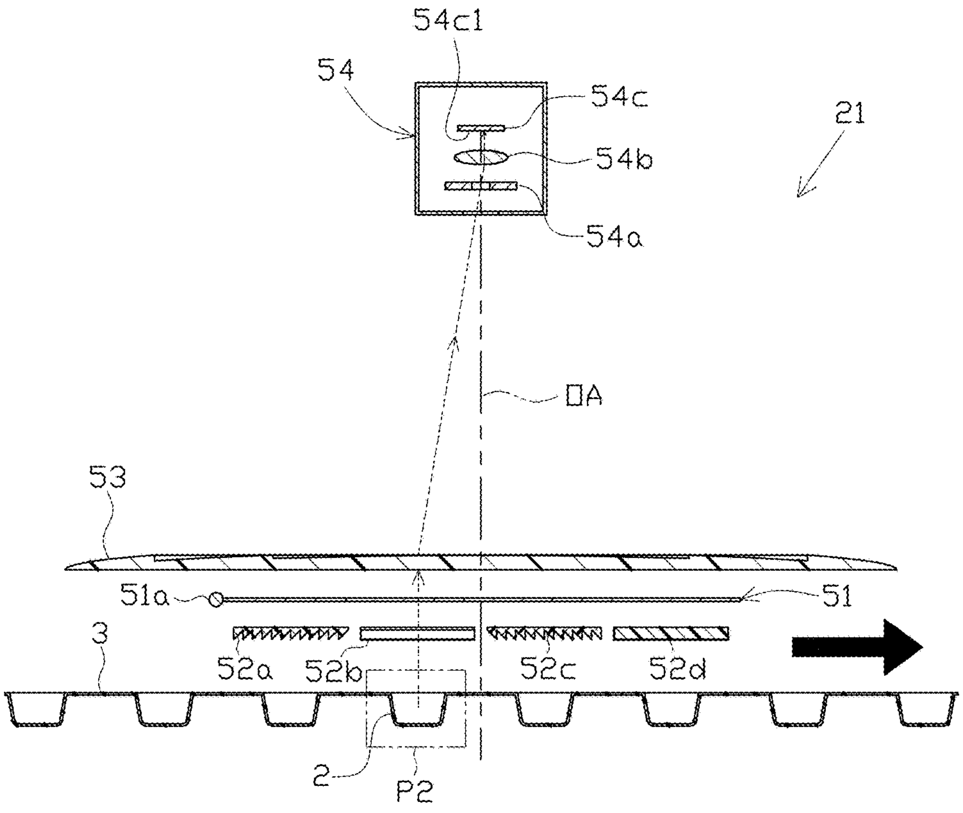
FIG. 16 is a schematic sectional view illustrating the container inspection device at the time of imaging pocket portions located in a second position in a section parallel to a transfer direction of the pocket portions.
Figure 17:
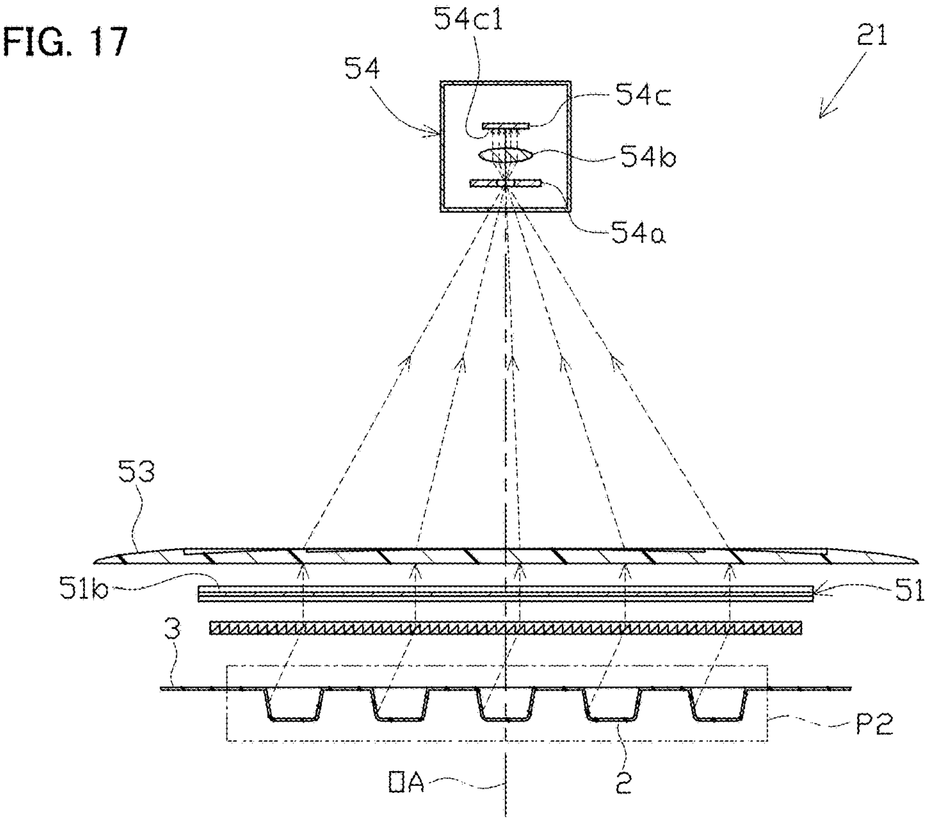
FIG. 17 is a schematic sectional view illustrating the container inspection device at the time of imaging the pocket portions located in the second position in a section perpendicular to the transfer direction of the pocket portions.

Furthermore, lights reflected from the one side wall areas AR2 of pocket portions 2 located in a predetermined second position P2 (shown in FIG. 16 and FIG. 17) enter the inclined faces 52*t*2 of the optical path conversion sheet 52*b*, while the optical paths of the lights reflected from the one side wall areas AR2 are converted into optical paths along the optical axis OA by the optical path conversion sheet 52*b*.

Figure 19:
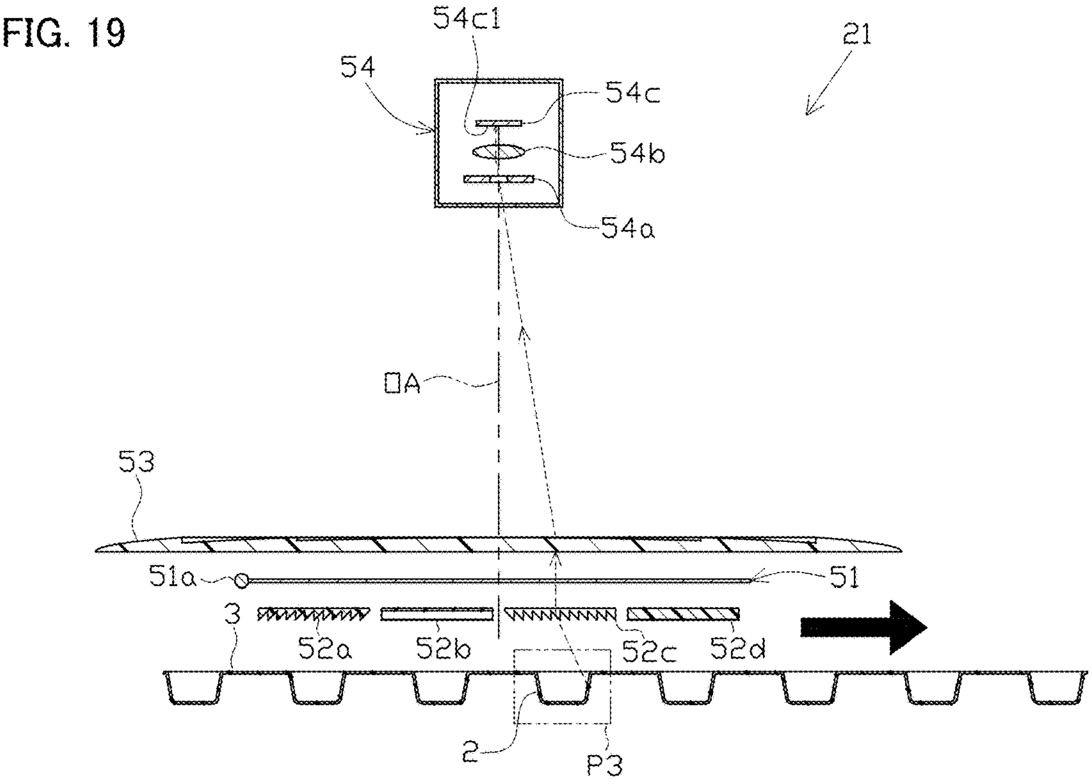
FIG. 19 is a schematic sectional view illustrating the container inspection device at the time of imaging pocket portions located in a third position.

Moreover, lights reflected from the one side wall areas AR3 of pocket portions 2 located in a predetermined third position P3 (shown in FIG. 19) enter the inclined faces 52*t*2 of the optical path conversion sheet 52*c*, while the optical paths of the lights reflected from the one side wall areas AR3 are converted into optical paths along the optical axis OA by the optical path conversion sheet 52*c*.

Figure 21:
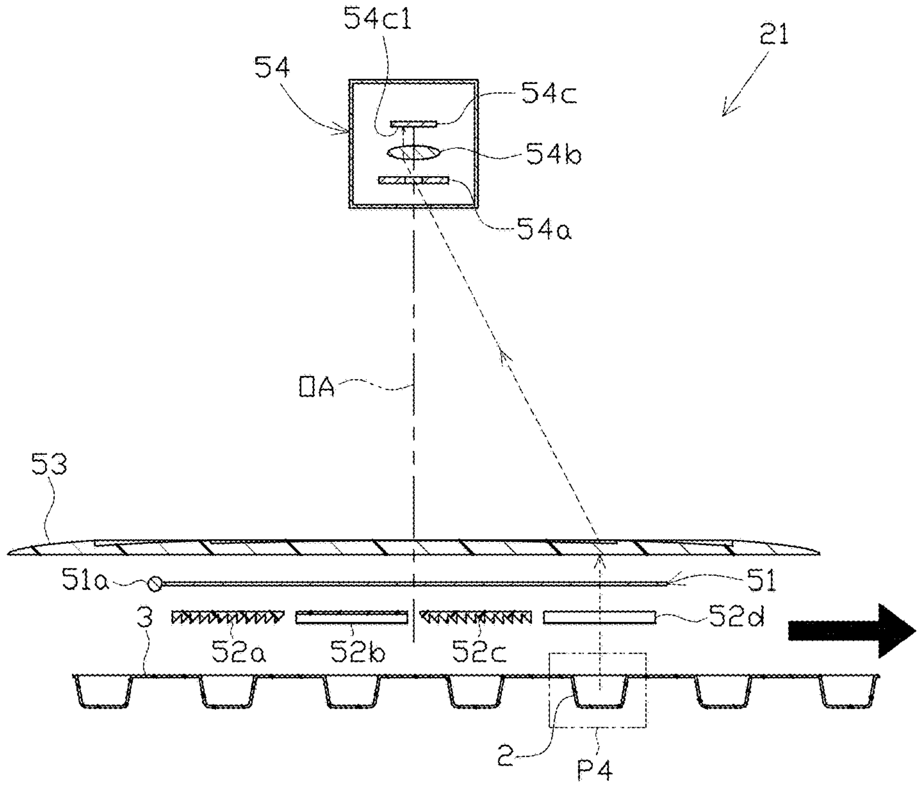
FIG. 21 is a schematic sectional view illustrating the container inspection device at the time of imaging pocket portions located in a fourth position in the section parallel to the transfer direction of the pocket portions.
Figure 22:
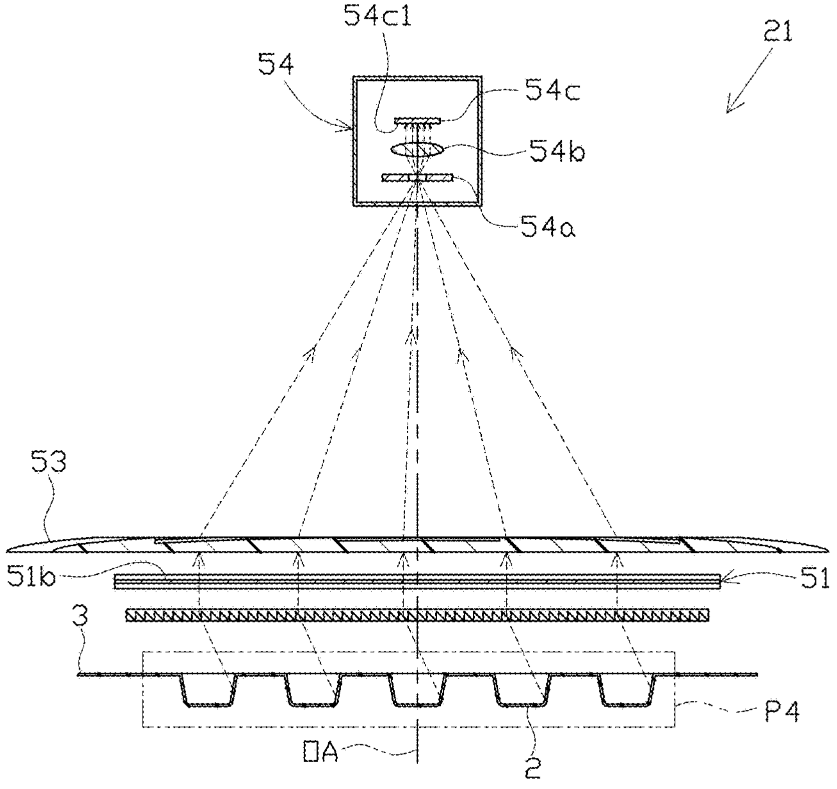
FIG. 22 is a schematic sectional view illustrating the container inspection device at the time of imaging the pocket portions located in the fourth position in the section perpendicular to the transfer direction of the pocket portions.

Additionally, lights reflected from the one side wall areas AR4 of pocket portions 2 located in a predetermined fourth position P4 (shown in FIG. 21 and FIG. 22) enter the inclined faces 52*t*2 of the optical path conversion sheet 52*d*, while the optical paths of the lights reflected from the one side wall areas AR4 are converted into optical paths along the optical axis OA by the optical path conversion sheet 52*d*.

Referring back to FIG. 7 and FIG. 8, the object-side lens 53 is placed between the camera 54 and the illumination device 51 and is configured to focus the lights having the optical paths converted by the optical path conversion sheets 52a to 52d. According to one or more embodiments, the object-side lens 53 is configured by a Fresnel lens and is a thin plate material made of a predetermined resin and provided with projections in a cutting blade shape arranged concentrically in a stepwise manner. Each of the projections serves as a refracting surface, and the object-side lens 53 has a similar function to that of a single general lens.

The camera 54 is placed on the opening side of the pocket portions 2 of the container film 3 and is configured by a camera (for example, a CCD camera or a CMOS camera) that has sensitivity to at least the light emitted from the illumination device 51. The camera 54 includes a diaphragm 54a, an element-side lens 54b and an imaging element (or imaging sensor) 54c.

The diaphragm 54a is placed between the object-side lens 53 and the element-side lens 54b and is configured to restrict the amount of light entering the imaging element 54c from the object-side lens 53 and thereby regulate the light imaged on a light-receiving face 54c1 of the imaging element 54c described later.

The element-side lens 54b is configured to convert the optical paths of the lights passing through the object-side lens 53, such as to make principal rays thereof parallel to the optical axis OA.

The imaging element 54c is configured by, for example, a CCD area sensor or a CMOS sensor to take an image of the light emitted from the illumination device 51. The imaging element 54c has a light-receiving face 54c1 where a plurality of light-receiving elements are arranged two-dimensionally in a matrix. The light-receiving face 54c1 is set to be perpendicular to the optical axis OA. When an imaging process by means of the camera 54 is performed, the imaging element 54c obtains image data. The obtained image data is sent to the image processing device 55.

According to one or more embodiments, the object-side lens 53, the diaphragm 54a and the element-side lens 54b configure an imaging optical system 56 that serves to form an image of the lights having the optical paths converted by the optical path conversion sheets 52a to 52d, on the imaging element 54c (on the light-receiving face 54c thereof). The imaging optical system 56 is configured to serve as an object-side telecentric optical system. In other words, the imaging optical system 56 is configured, such that the principal rays are made parallel to the optical axis OA on the object side (on the pocket portions 2-side) of the object-side lens 53. The imaging optical system 56 of one or more embodiments is a both-side telecentric optical system.

Figure 5:
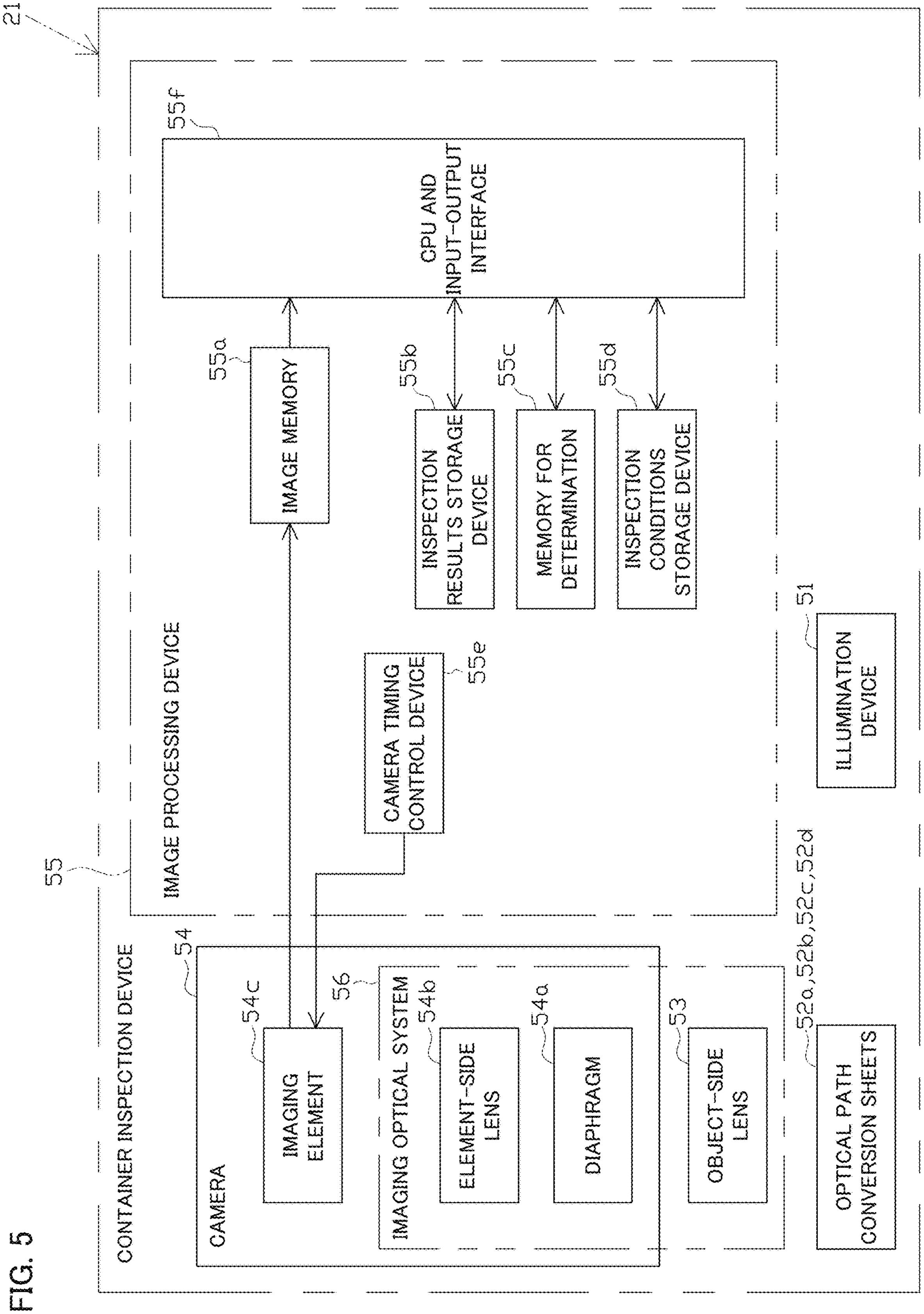
FIG. 5 is a block diagram illustrating the schematic configuration of a container inspection device.
Figure 6:
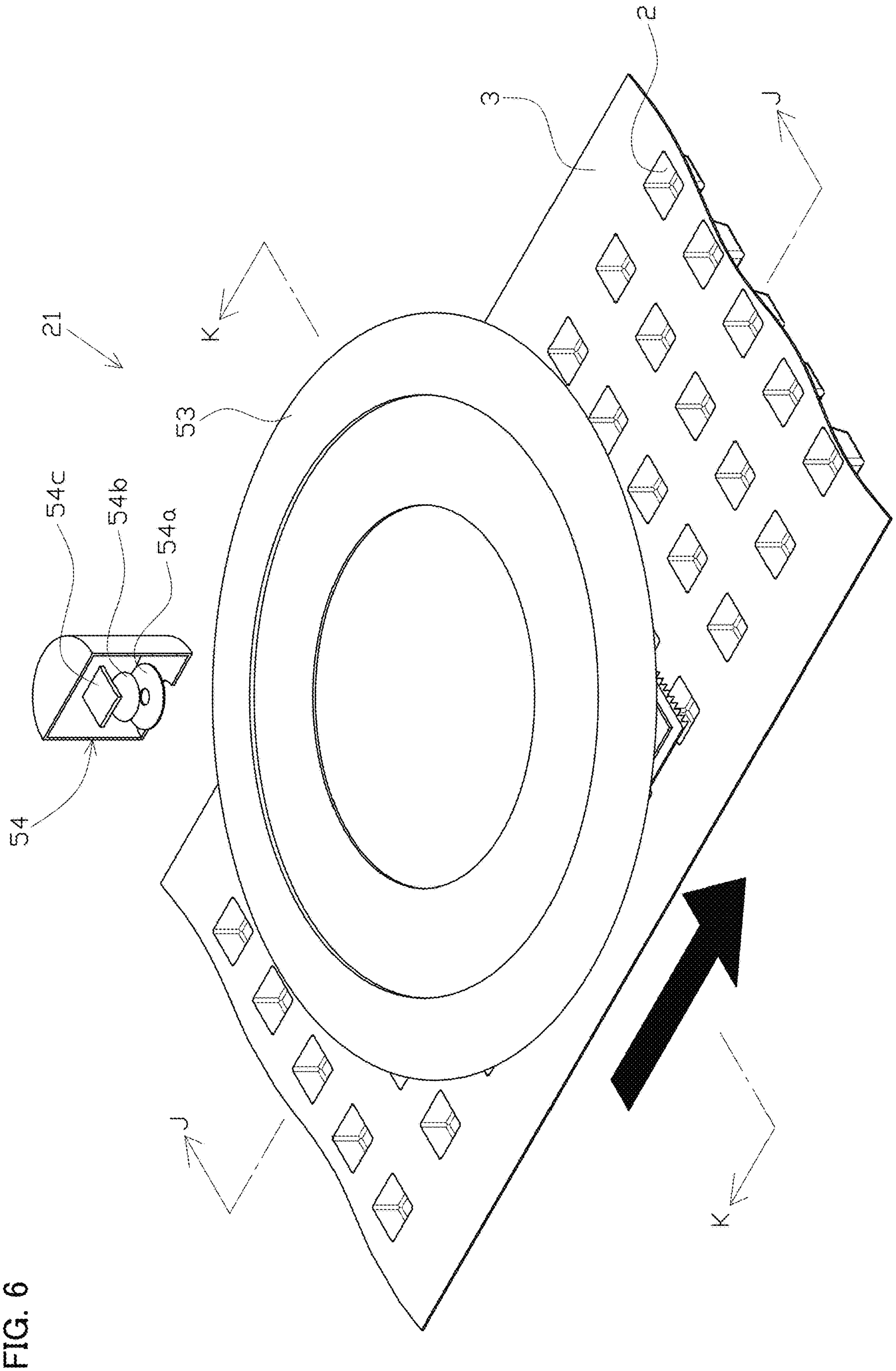
FIG. 6 is a perspective view illustrating the container inspection device.
Figure 7:
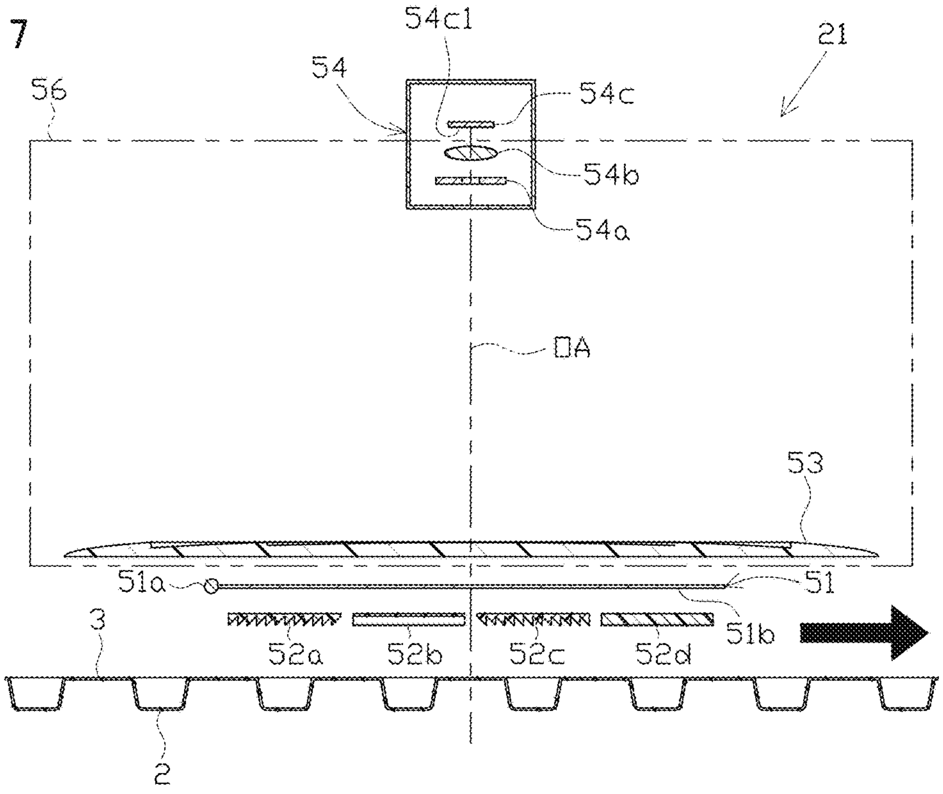
FIG. 7 is a schematic sectional view taken on a line J-J in FIG. 6.
Figure 8:
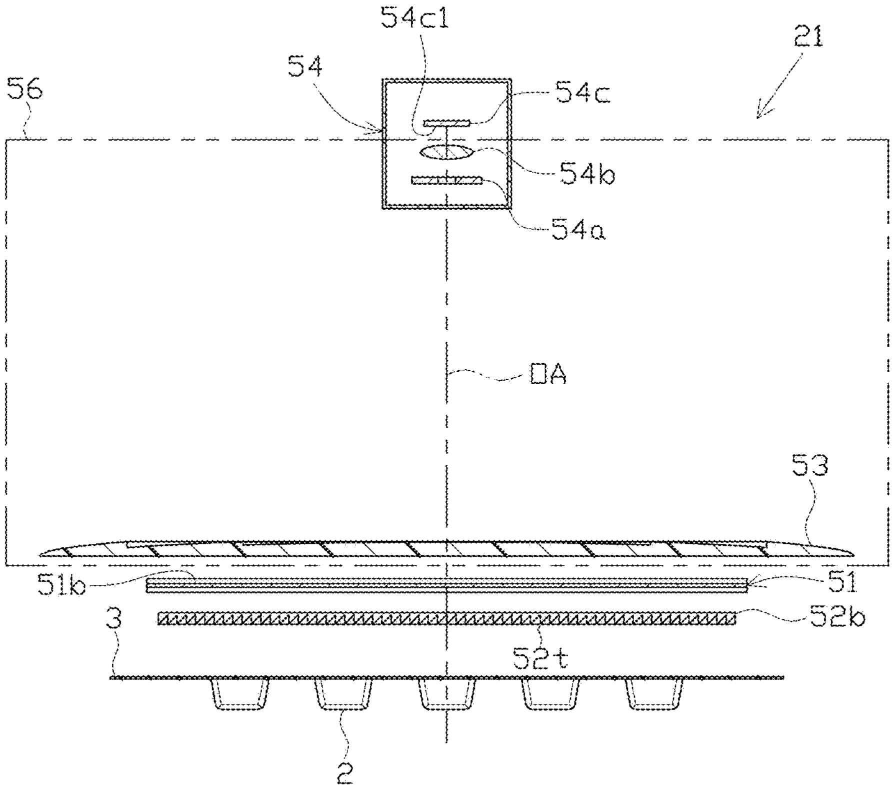
FIG. 8 is a schematic sectional view taken on a line K-K in FIG. 6.

The image processing device 55 is configured to perform defective/non-defective determination of at least the side wall portions 2b of the pocket portions 2, based on image data obtained from the light imaged on the imaging element 54c (the light-receiving face 54c1 thereof) (i.e., based on image data obtained by the camera 54). The image processing device 55 is configured by a so-called computer system including a CPU serving as an arithmetic unit, a ROM that stores a variety of programs, and a RAM that temporarily stores a variety of data, such as operation data and input and output data. As shown in FIG. 5, the image processing device 55 includes an image memory 55a, an inspection results storage device 55b, a memory for determination 55c, an inspection conditions storage device 55d, a camera timing control device 55e, and a CPU and input-output interface 55f.

The image memory 55a is configured to store image data input from the camera 54. An inspection for the defective/non-defective of the side wall portions 2b is performed, based on the image data stored in this image memory 55a. The image data may be subjected to processing in the course of the inspection. The processing herein includes, for example, a masking process and a shading correction.

The inspection results storage device 55b is configured to store data indicating the results of the defective/non-defective determination and statistic data obtained by processing the foregoing data in a stochastic and statistic manner.

The memory for determination 55c is configured to store various pieces of information used for the inspection. The various pieces of information include a program for determining the presence or the absence of any foreign substance, any dirt, and any formation failure (for example, wrinkle or break) of the pocket portion 2 and a variety of numerical values used for determination as criteria for the defective/non-defective determination.

The inspection conditions storage device 55d is configured to store, for example, the date and the time when each defective determination is given and inspection conditions used for the inspection.

The camera timing control device 55e is configured to control the imaging timing of the camera 54. More specifically, the camera timing control device 55e controls the camera 54 to perform imaging at respective timings when one line of pocket portions 2 arrayed in the direction perpendicular to the transfer direction are located in a first position P1, are located in a second position P2, are located in a third position P3 and are located in a fourth position P4.

Figure 15:
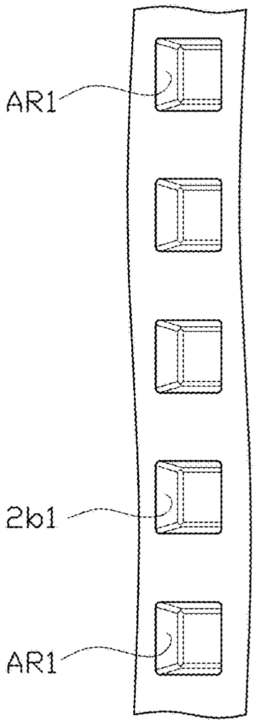
FIG. 15 is a schematic diagram illustrating part of image data obtained by imaging of the pocket portions located in the first position.
Figure 18:
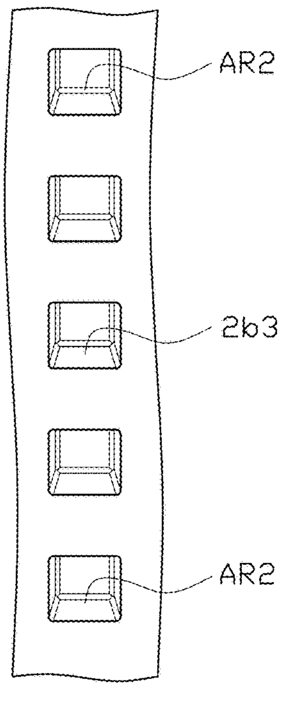
FIG. 18 is a schematic diagram illustrating part of image data obtained by imaging of the pocket portions located in the second position.
Figure 20:
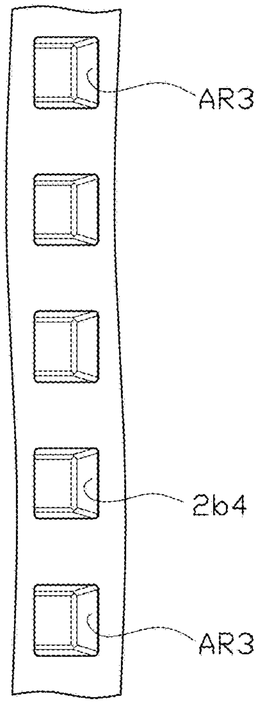
FIG. 20 is a schematic diagram illustrating part of image data obtained by imaging of the pocket portions located in the third position.
Figure 23:
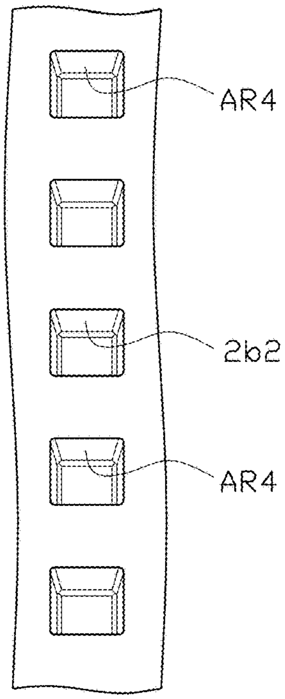
FIG. 23 is a schematic diagram illustrating part of image data obtained by imaging of the pocket portions located in the fourth position.

According to one or more embodiments, image data including portions relating to the one side wall areas AR1 (as shown in FIG. 15: only parts of image data are shown in FIG. 15, FIG. 18, FIG. 20 and FIG. 23) are obtained by imaging the pocket portions 2 located in the first position P1. Image data including portions relating to the one side wall areas AR2 (as shown in FIG. 18) are obtained by imaging the pocket portions 2 located in the second position P2. Image data including portions relating to the one side wall areas AR3 (as shown in FIG. 20) are obtained by imaging the pocket portions 2 located in the third position P3. Image data including portions relating to the one side wall areas AR4 (as shown in FIG. 23) are obtained by imaging the pocket portions 2 located in the fourth position P4. Four different image data obtained as described above are image data respectively relating to the different one side wall areas AR1 to AR4. These four different image data cover the entire circumferences of the side wall portions 2b of all the pocket portions 2 in one line.

The camera timing control device 55e controls the imaging timings of the camera 55, in response to signals from an encoder (not shown) provided in the PTP packaging machine 10 to obtain transfer amounts of the container film 3 (the pocket portions 2).

The CPU and input-output interface 55f has a function of inputting and outputting a variety of data including image data and the results of defective/non-defective determination and a function of executing a variety of programs. The CPU and input-output interface 55f uses the information stored in the memory for determination 55c and input image data to perform the defective/non-defective determination of at least the side wall portions 2b of the pocket portions 2. According to one or more embodiments, a predetermined defective/non-defective determination process is performed for all the obtained image data, so as to determine whether there is any defective part in the entire circumference of the side wall portion 2b of each pocket portion 2 by using the four different image data. The results of the defective/non-defective determination are stored in the inspection results storage device 55*b*. According to one or more embodiments, an inspection is performed for the presence or the absence of any foreign substance or any dirt adhering to the pocket portion 2 and the presence or the absence of any formation failure (wrinkle or break) of the pocket portion 2.

As described above in detail, the configuration of one or more embodiments allows for a simultaneous inspection for a plurality of pocket portions 2 and thereby improves the inspection efficiency.

Furthermore, the plurality of one-side wall areas AR1 to AR4 corresponding to the respective optical path conversion sheets 52*a* to 52*d* cover the entire circumference of the side wall portion 2*b* of the pocket portion 2. The configuration of one or more embodiments thus allows for an inspection for the entire circumference of the side wall portion 2*b*.

Moreover, compared with the prior art configuration of obliquely imaging the pocket portions 2, the configuration of one or more embodiments more effectively prevents a variation in the size (the area) of each of the one side wall areas AR1 to AR4 in the image data by the location of the pocket portion 2. This configuration accordingly suppresses a variation in inspection accuracy by the location of the pocket portion 2. The configuration of one or more embodiments also suppresses the part relating to each of the one side wall areas AR1 to AR4 in the image data from being affected by the light reflected from the other part of the pocket portion 2 and provides the clearer contour and the clearer shape of the part relating to each of the one side wall areas AR1 to AR4 and the clearer contour and the clearer shape of any defective part (for example, a dirt or a foreign substance) located in each of the one side wall areas AR1 to AR4 in the image data. As a result, this configuration can determine the presence or the absence of any defective part in the side wall portion 2*b* with the high accuracy and can specify the location of the defective part with the higher precision.

Additionally, the diaphragm 54*a* serves to regulate the light imaged on the imaging element 54*c* out of the lights having the optical paths converted by the optical path conversion sheets 52*a* to 52*d*. Accordingly, the configuration of one or more embodiments enables appropriate image data for the inspection to be obtained more reliably and more readily.

Furthermore, the object-side lens 53 is a Fresnel lens and thereby has a relatively small thickness. This configuration suppresses size expansion of the container inspection device 21 and enhances the flexibility in installation of the container inspection device 21.

Additionally, the optical path conversion sheets 52*a* to 52*d* have the sectional shapes described above. This configuration enables each of the optical path conversion sheets 52*a* to 52*d* to more reliably convert the optical path of the light reflected from or transmitted through the corresponding one of the one side wall areas AR1 to AR4 into an optical path along the direction of the optical axis OA of the imaging optical system 56, while more effectively preventing the optical path of the light reflected from the other part of the pocket portion 2 from being converted into an optical path along the direction of the optical axis OA. This configuration more reliably provides the clearer contour and the clearer shape of the part relating to each of the one side wall areas AR1 to AR4 and the clearer contour and the clearer shape of any defective part. As a result, this configuration can determine the presence or the absence of any defective part in the side wall portion 2*b* with the higher accuracy and can specify the location of the defective part with the higher precision.

The present disclosure is not limited to the description of the above embodiments but may be implemented, for example, by configurations described below. The present disclosure may also be naturally implemented by applications and modifications other than those illustrated below.

(a) According to the embodiments described above, the wavelength of the light emitted from the illumination device 51 is a wavelength that is not transmissive through the container film 3 (the pocket portions 2) having a normal thickness. According to another example of one or more embodiments, however, the wavelength of this light may be a wavelength that is transmissive through the container film 3 (the pocket portions 2) having a normal thickness. This modified configuration also enables the presence or the absence of any foreign substance, any dirt or any formation failure (wrinkle or break) of the pocket portion 2 to be determined, based on the image data.

Figure 24:
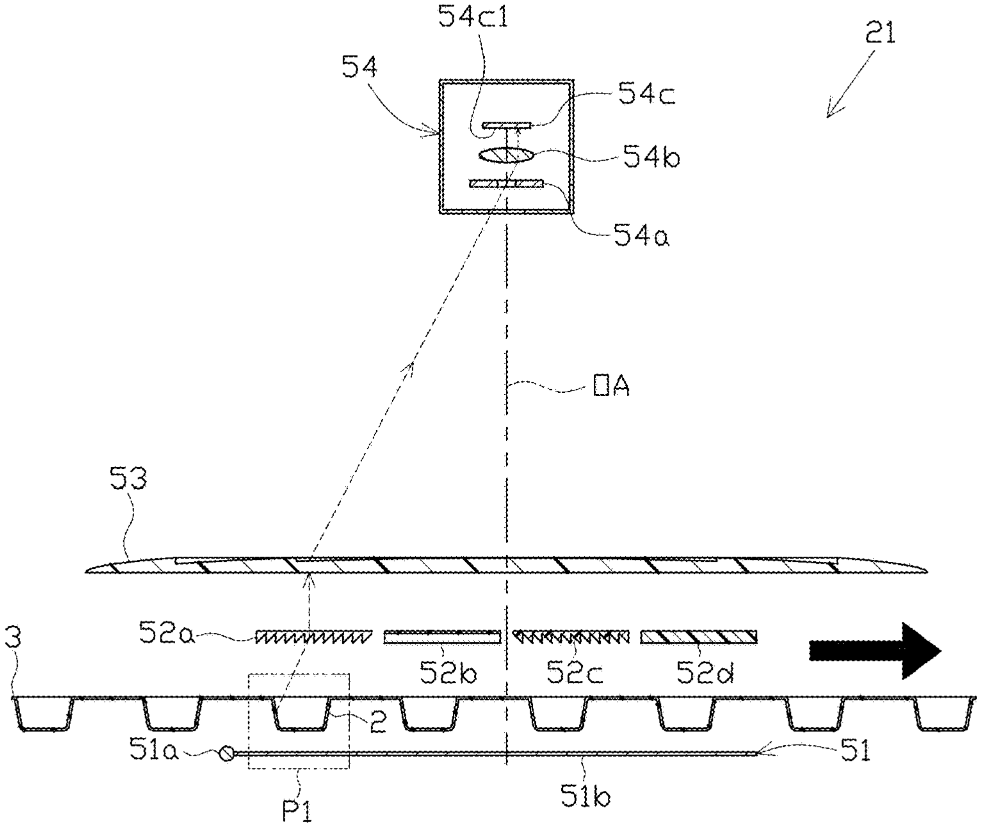
FIG. 24 is a schematic sectional view illustrating an illumination device according to another example of one or more embodiments.

(b) According to the embodiments described above, the illumination device 51 is placed on the opening side of the pocket portions 2, and the imaging element 54*c* is configured to take an image of the light reflected from the pocket portions 2. According to another example of one or more embodiments, however, as shown in FIG. 24, the illumination device 51 may be placed on a protrusion side of the pocket portions 2, and the imaging element 54*c* may be configured to take an image of the light transmitted through the pocket portions 2.

In this modified configuration, the wavelength of the light emitted from the illumination device 51 may be set to a wavelength that is not transmissive through the container film 3 (the pocket portions 2) having a normal thickness. This enables the presence or the absence of any pinhole or any formation failure of the pocket portion 2 to be determined, based on the image data. The wavelength of the light emitted from the illumination device 51 may alternatively be set to a wavelength that is transmissive through the container film 3 (the pocket portions 2) having a normal thickness. This enables the presence or the absence of any foreign substance, any dirt or any formation failure of the pocket portion 2 to be determined, based on the image data.

(c) According to the embodiments described above, the four optical path conversion sheets 52*a* to 52*d* are provided. The number of the optical path conversion sheets may, however, be changed appropriately.

Figure 25:
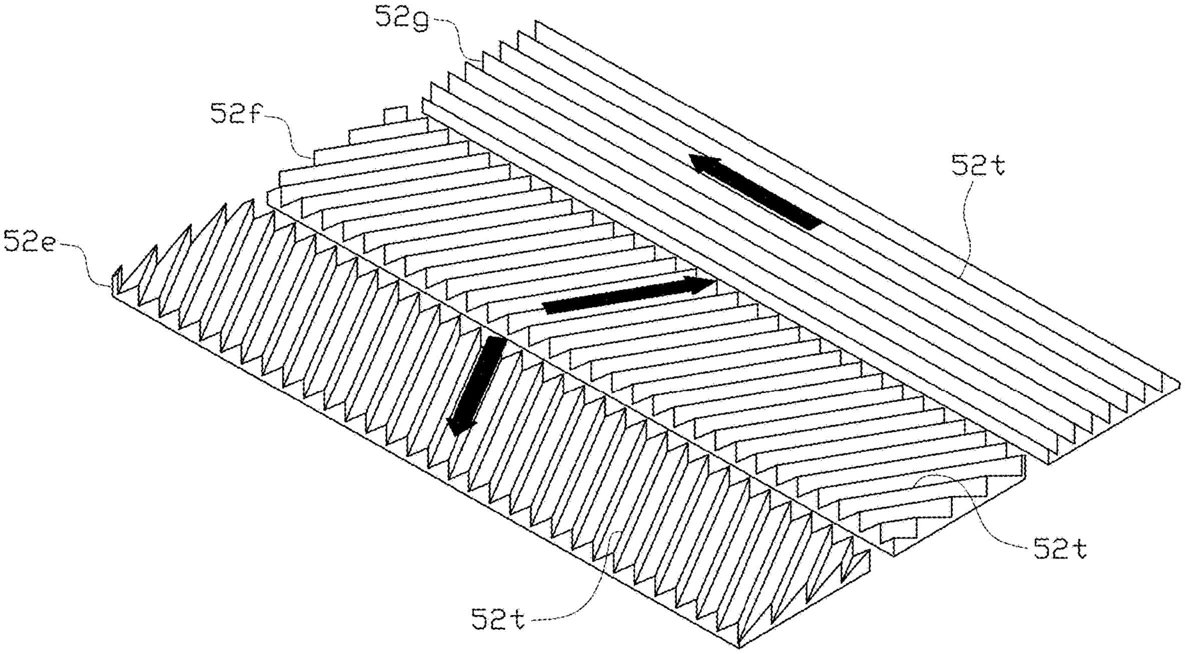
FIG. 25 is a schematic perspective view illustrating optical path conversion sheets according to another example of one or more embodiments.

For example, as shown in FIG. 25, three optical path conversion sheets 52*e*, 52*f* and 52*g* may be provided, such that a plurality of one side wall areas corresponding to the respective optical path conversion sheets 52*e*, 52*f* and 52*g* cover the entire circumference of the side wall portion 2*b*. In the configuration of one or more embodiments, the extending directions of the respective protrusions 52*t* in the optical path conversion sheets 52*e*, 52*f* and 52*g* may differ by 120 degrees each.

In another example, two optical path conversion sheets may be provided or five or more optical path conversion sheets may be provided, such that a plurality of one side wall areas corresponding to these optical path conversion sheets cover the entire circumference of the side wall portion 2*b*. In terms of further improving the inspection accuracy, it is preferable to set a plurality of one side wall areas such as to at least partly overlap with each other, like the embodiments described above.

(d) According to the embodiments described above, each of the optical path conversion sheets 52*a* to 52*d* corresponds to one line of pocket portions 2. According to another example of one or more embodiments, however, each of the optical path conversion sheets 52*a* to 52*d* may correspond to multiple lines of pocket portions 2. This modified configuration may thus allow for simultaneous imaging of multiple lines of pocket portions 2 through the corresponding one of the optical path conversion sheets 52*a* to 52*d*.

(e) The illumination device 51 of the above embodiments includes the light source 51*a* and the light guide plate 51*b*. The configuration of the illumination device may, however, be changed appropriately. For example, According to another example of one or more embodiments, an illumination device may be configured by a large number of light sources with omission of a light guide plate.

Figure 26:
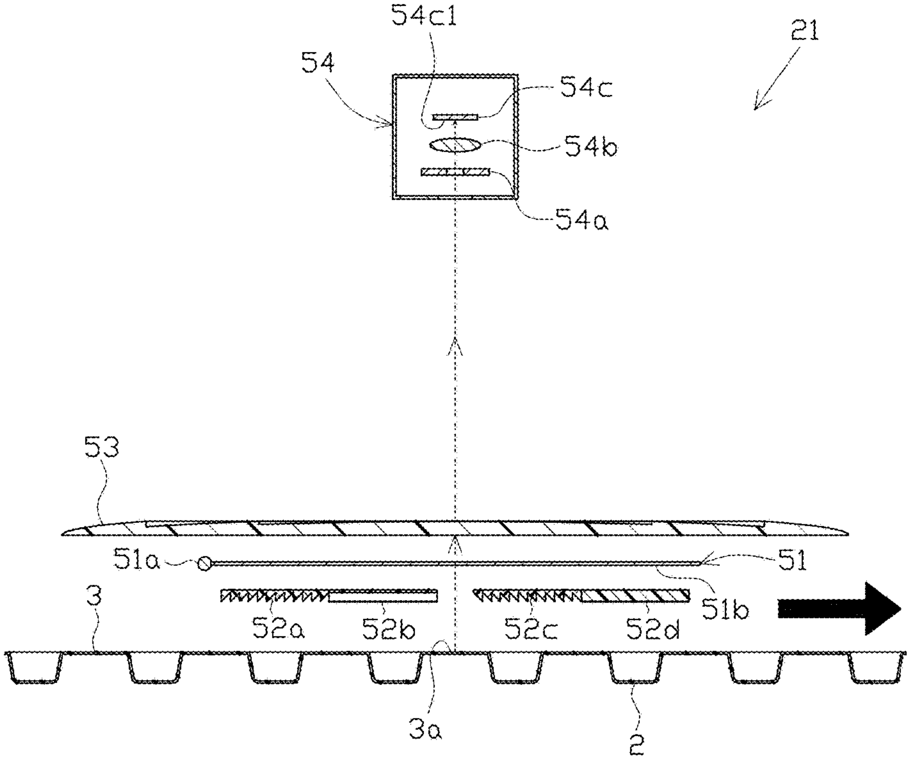
FIG. 26 is a schematic sectional view illustrating a container inspection device that performs imaging of a flange portion from between a plurality of optical path conversion sheets according to another example of one or more embodiments.
Figure 27:
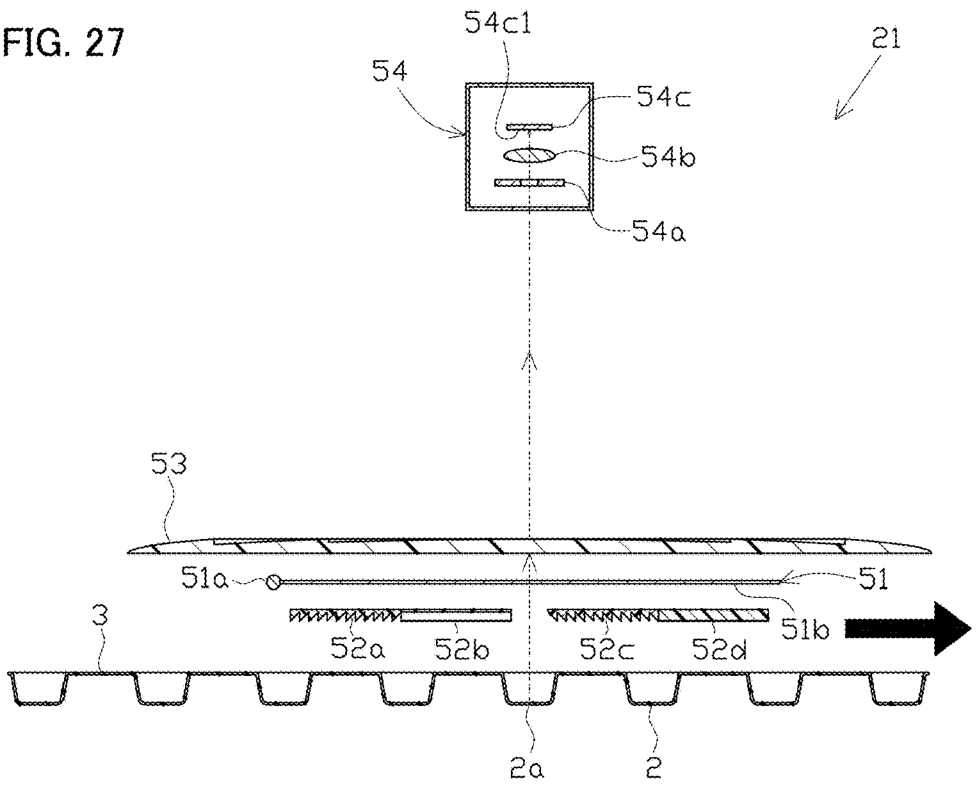
FIG. 27 is a schematic sectional view illustrating a container inspection device that performs imaging of a bottom wall portion from between the plurality of optical path conversion sheets according to another example of one or more embodiments.

(f) As shown in FIG. 26 and FIG. 27, another example of one or more embodiments may be configured to form a clearance between the adjacent optical path conversion sheets 52*b* and 52*c* and to form an image of the light, which is reflected from or transmitted through the flange portion 3*a* or the bottom wall portion 2*a*, through this clearance. This modified configuration causes the image processing device 55 to perform the defective/non-defective determination of the flange portion 3*a* or the bottom wall portion 2*a*, based on the image data obtained from the light reflected from or transmitted through the flange portion 3*a* or the bottom wall portion 2*a*. This modified configuration allows for an inspection for not only the side wall portion 2*b* but the flange portion 3*a* or the bottom wall portion 2*a*. This accordingly further improves the inspection efficiency, compared with a configuration of separately performing an inspection for the side wall portion 2*b* and an inspection for the flange portion 3*a* or the bottom wall portion 2*a*.

Figure 28:
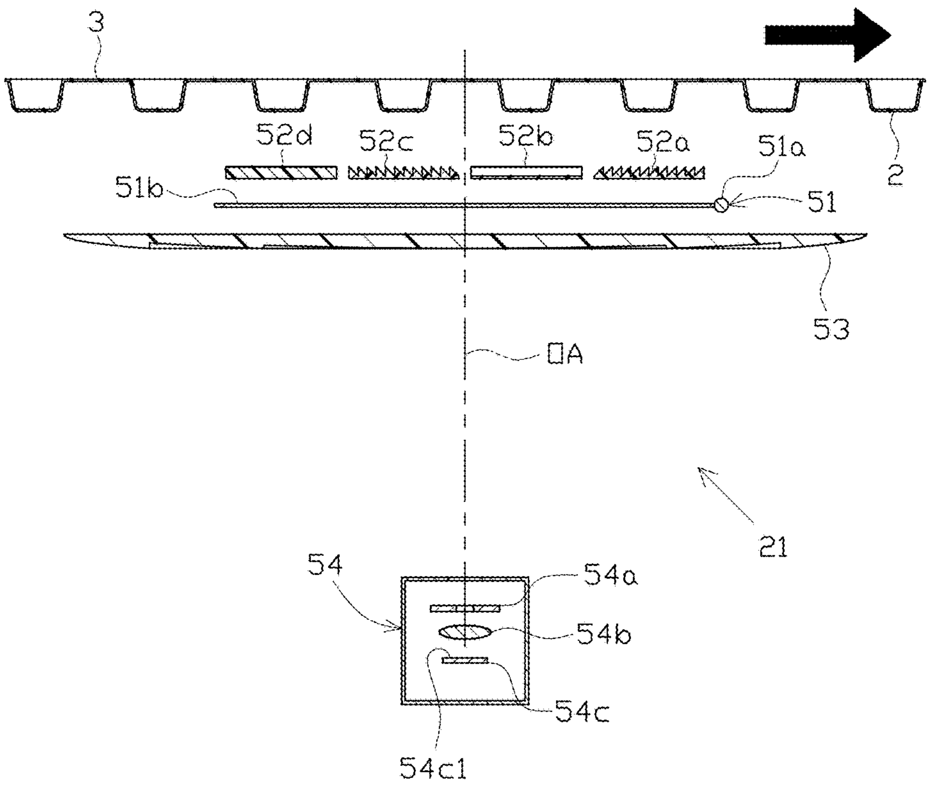
FIG. 28 is a schematic sectional view illustrating a container inspection device placed on a protrusion side of pocket portions according to another example of one or more embodiments.

(g) According to the embodiments described above, the container inspection device 21 (more specifically, the optical path conversion sheets 52*a* to 52*d*, the object-side lens 53 and the camera 54) is placed on the opening side of the pocket portions 2. According to another example of one or more embodiments, however, the container inspection device 21 may be placed on the protrusion side of the pocket portions 2 as shown in FIG. 28. This modified configuration may perform an inspection for an outer face of the pocket portion 2 (the side wall portion 2*b*), based on image data obtained from the light reflected from the pocket portion 2.

Figure 29:
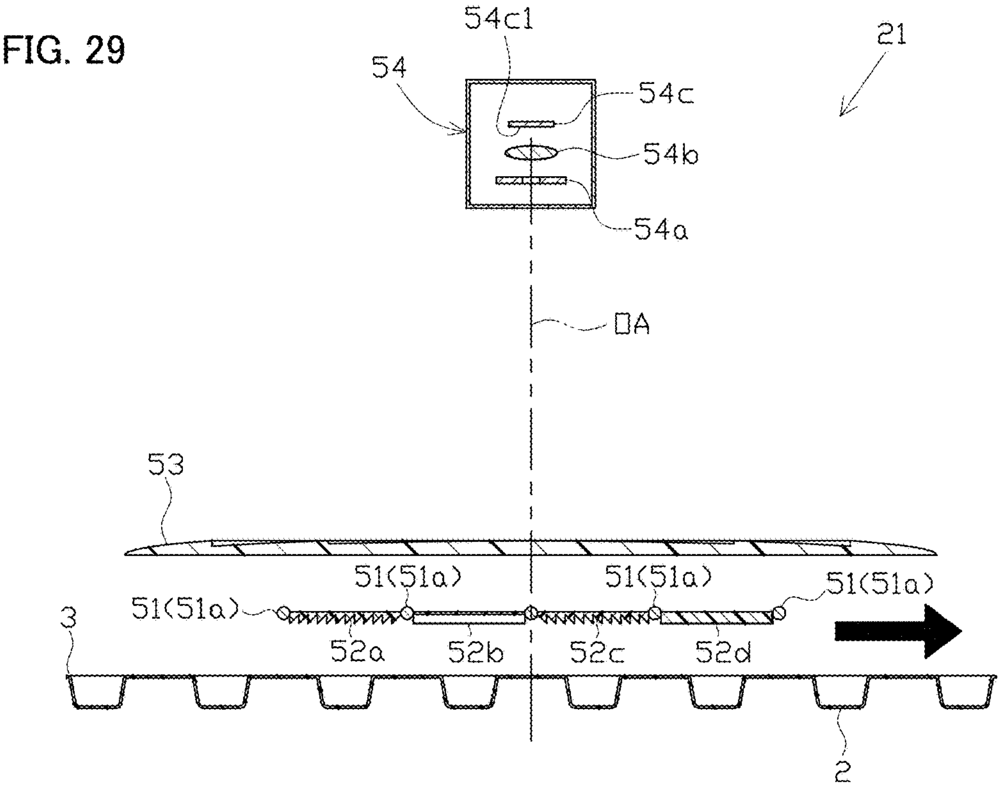
FIG. 29 is a schematic sectional view illustrating a container inspection device with an illumination device placed between optical path conversion sheets according to another example of one or more embodiments.

(h) As shown in FIG. 29, the illumination device 51 may be configured by light sources 51*a*, and the illumination device 51 (the light sources 51*a*) may be placed between the plurality of optical path conversion sheets 52*a* to 52*d*. In this modified configuration, the illumination device 51 is placed within the space between the optical path conversion sheets 52*a* to 52*d*. This achieves size reduction of the container inspection device 21.

Figure 30:
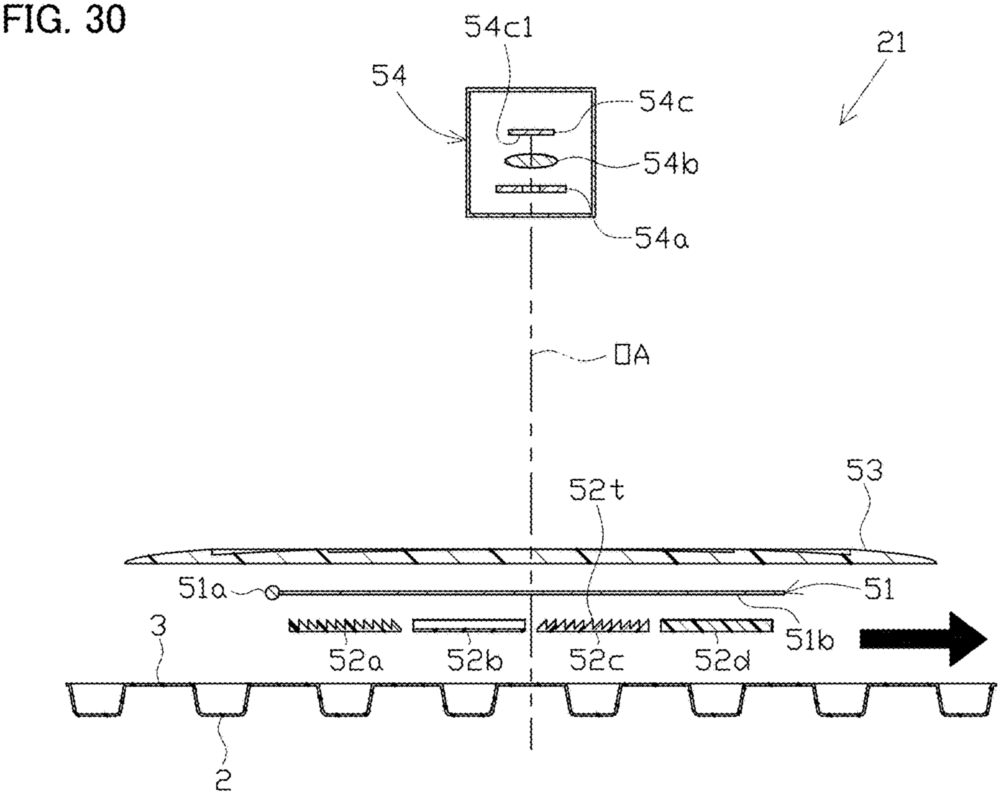
FIG. 30 is a schematic sectional view illustrating a container inspection device with turning optical path conversion sheets upside down according to another example of one or more embodiments.

(i) According to the embodiments described above, the surfaces (the faces with the protrusions 52*t* formed thereon) of the optical path conversion sheets 52*a* to 52*d* are located on the container film 3-side (on the pocket portions 2-side). According to another example of one or more embodiments, however, as shown in FIG. 30, the surfaces of the optical path conversion sheets 52*a* to 52*d* may be located on an opposite side to the container film 3 (the pocket portions 2), i.e., on the camera 54-side (the imaging element 54*c*-side).

(j) The embodiments described above are configured to perform imaging of the one side wall areas AR1 to AR4 corresponding to the respective optical path conversion sheets 52*a* to 52*d* at the different timings. Another example of one or more embodiments may, however, be configured to match the timings of imaging with regard to at least two one side wall areas among the plurality of one side wall areas. For example, the modified configuration may perform imaging at an identical timing with regard to the two one side wall areas AR1 and AR4. The modified configuration may also surely perform imaging at an identical timing with regard to all the one side wall areas AR1 to AR4.

According to the embodiments described above, image data with regard to one side wall area is obtained by one singe imaging operation. According to another example of one or more embodiments, however, image data with regard to one side wall area may be obtained by a plurality of imaging operations.

(k) According to the embodiments described above, the pocket portion 2 is in a rectangular shape in planar view. The pocket portion 2 may, however, be in a circular shape in planar view or may be in an elliptical shape in planar view.

(l) According to the embodiments described above, each pocket portion 2 as the "container" is connected with the other pocket portions 2 by the flange portion 3*a*. Each "container" may, however, be not connected with the other "containers" but may be provided individually and independently. Accordingly, the "container" may be a tray with a predetermined content (for example, a food item) placed thereon. In this case, trays are arranged in a plurality of lines and are transferred by a transfer unit, such as a conveyor, and the container inspection device 21 performs an inspection for side wall portions of a plurality of trays transferred.

(m) According to the embodiments described above, the container film 3 is made of a colorless and transparent thermoplastic resin material, such as PP or PVC, and the cover film 4 is made of aluminum. According to another example of one or more embodiments, however, the container film 3 may be made of a resin other than PP or PVC, and the cover film 4 may be made of a metal material other than aluminum or may be made of a resin material. Additionally, the container film 3 is not limited to be colorless and transparent but may be colored and transparent.

(n) According to the embodiments described above, the content is the tablet 5. The content is, however, not limited to the tablet but may be, for example, a capsule, an electronic component or a food item.

(o) According to the embodiments described above, the pocket portions 2 transferred are arranged in five lines. As long as the pocket portions 2 are transferred in an arrangement of multiple lines, however, the number of lines of the pocket portions 2 is not limited to five.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . PTP sheet (blister sheet), 2 . . . pocket portion (container), 2*a* . . . bottom wall portion, 2*b* . . . side wall portion, 3 . . . container film, 3*a* . . . flange portion, 4 . . . cover film, 10 . . . PTP packaging machine (blister packaging machine), 16 . . . pocket portion forming device (pocket portion forming unit), 20 . . . film receiving roll (transfer unit), 21 . . . container inspection device, 22 . . . filling device (filling unit), 51 . . . illumination device (irradiation unit or irradiator), 52*a*, 52*b*, 52*c*, 52*d* . . . optical path conversion sheets, 52*r* . . . rear face of the optical path conversion sheet), 52*t* . . . protrusions, 52*t*1 . . . approximately vertical face, 52*t*2 . . . inclined face, 53 . . . object-side lens, 54*a* . . . diaphragm, 54*c* . . . imaging element, 55 . . . image processing device (determination unit), 56 . . . imaging optical system, AR1, AR2, AR3, AR4 . . . one side wall areas, OA . . . optical axis

What is claimed is:

1. A container inspection device, comprising:

an irradiator that irradiates, with predetermined light, a plurality of containers transferred in an arrangement of multiple lines;

an imaging sensor that images the light radiated from the irradiator;

optical path conversion sheets that convert an optical path of the light radiated from the irradiator and reflected from or transmitted through side wall areas that extend in a circumferential direction of side walls of each of the containers;

an imaging optical system that forms an image of the light along the optical path converted by the optical path conversion sheets, onto the imaging sensor; and a hardware processor that identifies whether the side walls include a defect, based on image data obtained from the light imaged on the imaging sensor, wherein the optical path conversion sheets are laid across the multiple lines of the containers when viewed from an imaging sensor side, and disposed along a transfer direction of the containers, the optical path conversion sheets respectively correspond to the side wall areas, and each of the optical path conversion sheets converts the optical path of the light reflected from or transmitted through a corresponding one of the side wall areas into an optical path along an optical axis of the imaging optical system, and the side wall areas respectively corresponding to the optical path conversion sheets cover an entire circumference of the side walls.

2. The container inspection device according to claim 1, wherein the imaging optical system serves as an object-side telecentric optical system and comprise a diaphragm that regulates the light imaged on the imaging sensor.

3. The container inspection device according to claim 1, wherein the imaging optical system comprises an object-side lens that focuses the light along the optical path converted by the optical path conversion sheets, and the object-side lens is a Fresnel lens.

4. The container inspection device according to claim 1, wherein each of the optical path conversion sheets has a surface with protrusions arranged in parallel to one another, and each of the protrusions comprises:

a vertical face having an angle of not less than 80 degrees and not greater than 95 degrees with respect to a flat rear face of each of the optical path conversion sheets in a cross section perpendicular to an extending direction of the protrusions; and an inclined face having an angle of not less than 10 degrees and not greater than 55 degrees with respect to the rear face in the cross section.

5. The container inspection device according to claim 1, wherein the irradiator is disposed between the optical path conversion sheets.

6. The container inspection device according to claim 1, wherein the containers are connected with one another by a flange portion extending outward from respective edges of the side walls, the imaging optical system forms an image of light reflected from or transmitted through the flange portion, from between the optical path conversion sheets, onto the imaging sensor, and the hardware processor identifies whether the flange portion includes a defect, based on the image data.

7. The container inspection device according to claim 1, wherein the imaging optical system forms an image of light reflected from or transmitted through a bottom wall of each of the containers, from between the optical path conversion sheets, onto the imaging sensor, and the hardware processor identifies whether the bottom wall includes a defect, based on the image data.

8. A blister packaging machine that manufactures a blister sheet, the blister packaging machine comprising:

a pocket portion forming device that forms pocket portions to be arranged in multiple lines in a belt-shaped container film;

a roll that transfers the container film;

a filling device that fills each of the pocket portions with a content; and the container inspection device according to claim 1, wherein the container inspection device is disposed between the pocket portion forming device and the filling device along a transfer path of the container film, and identifies whether the side walls of each of the pocket portions include a defect.

* * * * *